(12) United States Patent
Hamaguchi et al.

(10) Patent No.: US 9,557,834 B2
(45) Date of Patent: Jan. 31, 2017

(54) TOUCH PANEL SYSTEM, STYLUS PEN, AND ELECTRONIC DEVICE

(71) Applicant: SHARP KABUSHIKI KAISHA, Osaka-shi, Osaka (JP)

(72) Inventors: Mutsumi Hamaguchi, Osaka (JP); Shinji Shinjo, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/786,120

(22) PCT Filed: Apr. 22, 2014

(86) PCT No.: PCT/JP2014/061304
§ 371 (c)(1),
(2) Date: Oct. 21, 2015

(87) PCT Pub. No.: WO2014/181680
PCT Pub. Date: Nov. 13, 2014

(65) Prior Publication Data
US 2016/0070374 A1  Mar. 10, 2016

(30) Foreign Application Priority Data
May 10, 2013  (JP) .................................. 2013-100653

(51) Int. Cl.
*G06F 3/0354* (2013.01)
*G06F 3/044* (2006.01)
*G06F 3/041* (2006.01)

(52) U.S. Cl.
CPC .......... *G06F 3/03545* (2013.01); *G06F 3/044* (2013.01); *G06F 3/0416* (2013.01)

(58) Field of Classification Search
USPC ...................... 178/19.01–19.07; 345/179–183
See application file for complete search history.

(56) References Cited

U.S. PATENT DOCUMENTS

2005/0073324 A1* 4/2005 Umeda .............. G01R 27/2605
  324/662
2007/0109274 A1* 5/2007 Reynolds ................ G06F 3/041
  345/173

(Continued)

FOREIGN PATENT DOCUMENTS

| JP | 2011-76265 A | 4/2011 |
| JP | 2011-123905 A | 6/2011 |
| JP | 2011-164801 A | 8/2011 |

OTHER PUBLICATIONS

International Search Report, issued in PCT/JP2014/061304, dated Jul. 22, 2014.

(Continued)

*Primary Examiner* — Chad Dicke
(74) *Attorney, Agent, or Firm* — Birch, Stewart, Kolasch & Birch, LLP

(57) ABSTRACT

A touch panel system (1) according to one aspect of the invention includes: a stylus pen (15) including a drive circuit (26) that generates a first driving voltage based on a first code sequence and a second driving voltage based on a second code sequence, and a sensor circuit (40) that drives a pen point (38) with a multiplexed voltage obtained by multiplexing the first driving voltage and the second driving voltage; and a touch panel controller (2) that detects a position of the stylus pen (15) touching a touch panel.

8 Claims, 13 Drawing Sheets

(56) References Cited

U.S. PATENT DOCUMENTS

| | | |
|---|---|---|
| 2008/0128180 A1 | 6/2008 | Perski et al. |
| 2011/0193776 A1* | 8/2011 | Oda ........................ G06F 3/046 345/157 |
| 2012/0050207 A1 | 3/2012 | Westhues et al. |
| 2012/0105361 A1* | 5/2012 | Kremin ............... G06F 3/03545 345/174 |
| 2013/0207926 A1* | 8/2013 | Kremin ................ G06F 3/0383 345/174 |

OTHER PUBLICATIONS

Written Opinion of the International Searching Authority, issued in PCT/JP2014/061304, dated Jul. 22, 2014.

* cited by examiner

FIG. 11

| Rp[kΩ] | L(M+2) | L(M+1) | L(M+2)/L(M+1) | Rp/R | L(M+2)+L(M+1) |
|---|---|---|---|---|---|
| 0.00 | -1.00 | 127.00 | -0.01 | 0.00 | 126 |
| 1.00 | 10.64 | 115.36 | 0.09 | 0.10 | 126 |
| 2.00 | 20.33 | 105.67 | 0.19 | 0.20 | 126 |
| 3.00 | 28.54 | 97.46 | 0.29 | 0.30 | 126 |
| 4.00 | 35.57 | 90.43 | 0.39 | 0.40 | 126 |
| 5.00 | 41.67 | 84.33 | 0.49 | 0.50 | 126 |
| 5.50 | 44.42 | 81.58 | 0.54 | 0.55 | 126 |
| 6.00 | 47.00 | 79.00 | 0.59 | 0.60 | 126 |
| 6.50 | 49.42 | 76.58 | 0.65 | 0.65 | 126 |
| 7.00 | 51.71 | 74.29 | 0.70 | 0.70 | 126 |
| 7.50 | 53.86 | 72.14 | 0.75 | 0.75 | 126 |
| 8.00 | 55.89 | 70.11 | 0.80 | 0.80 | 126 |
| 8.50 | 57.81 | 68.19 | 0.85 | 0.85 | 126 |
| 9.00 | 59.63 | 66.37 | 0.90 | 0.90 | 126 |
| 9.50 | 61.36 | 64.64 | 0.95 | 0.95 | 126 |
| 10.00 | 63.00 | 63.00 | 1.00 | 1.00 | 126 |
| 10.50 | 64.56 | 61.44 | 1.05 | 1.05 | 126 |
| 11.00 | 66.05 | 59.95 | 1.10 | 1.10 | 126 |
| 11.50 | 67.47 | 58.53 | 1.15 | 1.15 | 126 |
| 12.00 | 68.82 | 57.18 | 1.20 | 1.20 | 126 |
| 12.50 | 70.11 | 55.89 | 1.25 | 1.25 | 126 |
| 13.00 | 71.35 | 54.65 | 1.31 | 1.30 | 126 |
| 13.50 | 72.53 | 53.47 | 1.36 | 1.35 | 126 |
| 14.00 | 73.67 | 52.33 | 1.41 | 1.40 | 126 |
| 14.50 | 74.76 | 51.24 | 1.46 | 1.45 | 126 |
| 15.00 | 75.80 | 50.20 | 1.51 | 1.50 | 126 |
| 16.00 | 77.77 | 48.23 | 1.61 | 1.60 | 126 |
| 17.00 | 79.59 | 46.41 | 1.72 | 1.70 | 126 |
| 18.00 | 81.29 | 44.71 | 1.82 | 1.80 | 126 |
| 19.00 | 82.86 | 43.14 | 1.92 | 1.90 | 126 |
| 20.00 | 84.33 | 41.67 | 2.02 | 2.00 | 126 |
| 22.00 | 87.00 | 39.00 | 2.23 | 2.20 | 126 |
| 24.00 | 89.35 | 36.65 | 2.44 | 2.40 | 126 |
| 26.00 | 91.44 | 34.56 | 2.65 | 2.60 | 126 |
| 28.00 | 93.32 | 32.68 | 2.86 | 2.80 | 126 |
| 30.00 | 95.00 | 31.00 | 3.06 | 3.00 | 126 |
| 35.00 | 98.56 | 27.44 | 3.59 | 3.50 | 126 |
| 40.00 | 101.40 | 24.60 | 4.12 | 4.00 | 126 |
| 50.00 | 105.67 | 20.33 | 5.20 | 5.00 | 126 |
| 60.00 | 108.71 | 17.29 | 6.29 | 6.00 | 126 |
| 70.00 | 111.00 | 15.00 | 7.40 | 7.00 | 126 |
| 80.00 | 112.78 | 13.22 | 8.53 | 8.00 | 126 |
| 90.00 | 114.20 | 11.80 | 9.68 | 9.00 | 126 |
| 100.00 | 115.36 | 10.64 | 10.85 | 10.00 | 126 |
| 1000000000.00 | 127.00 | -1.00 | -127.00 | 100000000.00 | 126 |

FIG. 14

$$\begin{pmatrix} -1 & 1 & -1 & 1 & 1 & 1 & -1 \\ -1 & -1 & 1 & -1 & 1 & 1 & 1 \\ 1 & -1 & -1 & 1 & -1 & 1 & 1 \\ 1 & 1 & -1 & -1 & 1 & -1 & 1 \\ 1 & 1 & 1 & -1 & -1 & 1 & -1 \\ -1 & 1 & 1 & 1 & -1 & -1 & 1 \\ 1 & -1 & 1 & 1 & 1 & -1 & -1 \end{pmatrix} \begin{pmatrix} C1 \\ C2 \\ * \\ . \\ . \\ C7 \end{pmatrix} = \begin{pmatrix} Y1 \\ Y2 \\ * \\ . \\ . \\ Y7 \end{pmatrix} \quad \cdots \text{FORMULA (2)}$$

$$\begin{pmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{pmatrix} \begin{pmatrix} -1 & 1 & -1 & 1 & 1 & 1 & -1 \\ -1 & -1 & 1 & -1 & 1 & 1 & 1 \\ 1 & -1 & -1 & 1 & -1 & 1 & 1 \\ 1 & 1 & -1 & -1 & 1 & -1 & 1 \\ 1 & 1 & 1 & -1 & -1 & 1 & -1 \\ -1 & 1 & 1 & 1 & -1 & -1 & 1 \\ 1 & -1 & 1 & 1 & 1 & -1 & -1 \end{pmatrix} \begin{pmatrix} C1 \\ C2 \\ * \\ . \\ . \\ C7 \end{pmatrix} = \begin{pmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{pmatrix} \begin{pmatrix} Y1 \\ Y2 \\ * \\ . \\ . \\ Y7 \end{pmatrix} \quad \cdots \text{FORMULA (3)}$$

$$\begin{pmatrix} 7 & -1 & -1 & -1 & -1 & -1 & -1 \\ -1 & 7 & -1 & -1 & -1 & -1 & -1 \\ -1 & -1 & 7 & -1 & -1 & -1 & -1 \\ -1 & -1 & -1 & 7 & -1 & -1 & -1 \\ -1 & -1 & -1 & -1 & 7 & -1 & -1 \\ -1 & -1 & -1 & -1 & -1 & 7 & -1 \\ -1 & -1 & -1 & -1 & -1 & -1 & 7 \end{pmatrix} \begin{pmatrix} C1 \\ C2 \\ * \\ . \\ . \\ C7 \end{pmatrix} = \begin{pmatrix} -1 & -1 & 1 & 1 & 1 & -1 & 1 \\ 1 & -1 & -1 & 1 & 1 & 1 & -1 \\ -1 & 1 & -1 & -1 & 1 & 1 & 1 \\ 1 & -1 & 1 & -1 & -1 & 1 & 1 \\ 1 & 1 & -1 & 1 & -1 & -1 & 1 \\ 1 & 1 & 1 & -1 & 1 & -1 & -1 \\ -1 & 1 & 1 & 1 & -1 & 1 & -1 \end{pmatrix} \begin{pmatrix} Y1 \\ Y2 \\ * \\ . \\ . \\ Y7 \end{pmatrix} \quad \cdots \text{FORMULA (4)}$$

TOUCH PANEL SYSTEM, STYLUS PEN, AND ELECTRONIC DEVICE

TECHNICAL FIELD

The present invention relates to a touch panel system provided with a stylus pen for touching a touch panel which has a plurality of electrostatic capacitances formed at respective intersections of a plurality of first signal lines and a plurality of second signal lines and a touch panel controller for detecting a position of the stylus pen, and particularly relates to a touch panel system provided with a touch panel controller for driving the plurality of first signal lines and the plurality of second signal lines alternately. Moreover, the invention relates to an electronic device provided with such a touch panel system.

BACKGROUND ART

A touch panel system in which an input operation on a touch panel is able to be performed when a user touches, with his/her finger or a touch pen, a touch panel which has a plurality of electrostatic capacitances formed at respective intersections of a plurality of first signal lines and a plurality of second signal lines is becoming pervasive. For example, in a touch panel system of a capacitive sensing method, change in an electrostatic capacitance in a touch panel, which is caused when a finger of a user or a touch pen makes contact with the touch panel, is detected, and a position at which the change in the electrostatic capacitance is caused in the touch panel is recognized as an input position to the touch panel.

Moreover, in these years, a technique relating to a touch panel system which includes, as a pen for touching a touch panel with, a stylus pen provided with a function of outputting a signal by driving a pen point is attracting attention. Furthermore, a technique for improving convenience of a user in a touch panel system by sending, for example, information indicating a writing pressure (writing pressure information), information indicating inclination of a stylus pen, or the like from the stylus pen to a touch panel is also being developed.

PTL 1 discloses a pointer (stylus pen) which performs transmission in association with a time difference between two codes of a code for detecting a position of the pointer and a code for indicating writing pressure information and a position detection apparatus which detects, from the time difference between the two codes transmitted from the pointer, a pressure applied to the pointer.

PTL 2 discloses a technique for transmitting writing pressure information by controlling an oscillation frequency of a stylus (stylus pen) in accordance with a pressure on a stylus end.

CITATION LIST

Patent Literature

PTL 1: Japanese Unexamined Patent Application Publication No. 2011-164801 (published on Aug. 25, 2011)"
PTL 2: Japanese Unexamined Patent Application Publication No. 2011-123905 (published on Jun. 23, 2011)"

SUMMARY OF INVENTION

Technical Problem

However, with the technique of PTL 1, since the time difference is provided between transmission timings of the two codes in order to transfer the writing pressure information, it becomes necessary to provide a waiting time during one cycle, which was conventionally unnecessary, so that deterioration in a frequency of an output signal of the pointer is caused. Additionally, with the technique of PTL 1, it is necessary to provide a code generation circuit for controlling timings, at which the two codes are to be generated, correspondingly to a pressure applied to a tip of the pointer.

Moreover, with the technique of PTL 2, both of oscillation performance of a frequency in the stylus and detection performance of a frequency in a touch panel are required to be high performance.

Furthermore, as another method of transferring the writing pressure information, considered is a method of transferring the writing pressure information by changing a driving voltage of a stylus pen according to a writing pressure, but this method causes necessity of providing, in the pen, a circuit for changing the driving voltage according to the writing pressure. Here, since a pen signal is small, even in a stylus pen which does not transfer writing pressure information, the driving voltage in the stylus pen is normally set to be large. Thus, in the stylus pen which transfers the writing pressure information, a booster circuit becomes necessary in order to further increase the driving voltage, and a process capable of enduring a boosted voltage becomes necessary, which contributes to an increase in costs.

The invention has been made in order to solve the aforementioned problems, and a main object thereof is to provide a touch panel system in which additional information is able to be supplied from a stylus pen to a touch panel controller, with a simple configuration.

Solution to Problem

A touch panel system according to one aspect of the invention is a touch panel system, including: a stylus pen for touching a touch panel which has M first signal lines (M is plural), K second signal lines (K is plural) which intersect with the M first signal lines, and (M×K) electrostatic capacitances formed at respective intersections of the first signal lines and the second signal lines; and a touch panel controller that detects a position of the stylus pen, in which the stylus pen includes a driving circuit which generates a first driving voltage based on a first code sequence and a second driving voltage based on a second code sequence, and a multiplexing circuit which drives a pen point of the stylus pen with a multiplexed voltage obtained by multiplexing the first driving voltage and the second driving voltage, and the multiplexing circuit has a variable resistor one end of which is connected to a first terminal to which the first driving voltage is applied and whose resistance value changes based on information regarding the stylus pen, a fixed resistor one end of which is connected to a second terminal to which the second driving voltage is applied, and an output terminal which is connected to the other end of the fixed resistor and the other end of the variable resistor and which outputs the multiplexed voltage.

A stylus pen according to one aspect of the invention is a stylus pen for touching a touch panel which has M first signal lines (M is plural), K second signal lines (K is plural) which intersect with the M first signal lines, and (M×K) electrostatic capacitances formed at respective intersections of the first signal lines and the second signal lines, including: a driving circuit which generates a first driving voltage based on a first code sequence and a second driving voltage based on a second code sequence; and a multiplexing circuit which drives a pen point of the stylus pen with a multiplexed voltage obtained by multiplexing the first driving voltage and the second driving voltage, in which the multiplexing circuit has a variable resistor one end of which is connected to a first terminal to which the first driving voltage is applied and whose resistance value changes based on information regarding the stylus pen, a fixed resistor one end of which is connected to a second terminal to which the second driving voltage is applied, and an output terminal which is connected to the other end of the fixed resistor and the other end of the variable resistor and which outputs the multiplexed voltage.

Advantageous Effects of Invention

According to one aspect of the invention, the multiplexing circuit included in the stylus pen outputs, as the multiplexed voltage, the first driving voltage and the second driving voltage from the output terminal to which the fixed resistor and the variable resistor are connected, and drives the pen point of the stylus pen with the multiplexed voltage. That is, the stylus pen multiplexes two code sequences into one multiplexed voltage in the multiplexing circuit and drives the pen point with the multiplexed voltage.

Accordingly, in order to supply the information regarding the stylus pen (hereinafter, additional information) to the touch panel controller, the stylus pen does not need to transmit a code indicating the additional information and a code for detecting a position with a time difference. In addition, the stylus pen does not need to have high withstanding voltage performance nor high frequency oscillation performance.

Further, the touch panel controller is able to detect a position of the stylus pen and is also able to detect the additional information, from a voltage of the pen point of the stylus pen which is driven with the multiplexed voltage obtained by multiplexing the driving voltages based on the two code sequences.

Thereby, the touch panel system is able to supply the additional information from the stylus pen to the touch panel controller, with a simple configuration.

BRIEF DESCRIPTION OF DRAWINGS

FIG. 11 is a table indicating specific values of each curve in the graph illustrated in FIG. 10.

FIG. 14 is a diagram for explaining a formula indicating a method of driving the touch panel system according to one embodiment of the invention in parallel by an M sequence code having a code length of 7.

DESCRIPTION OF EMBODIMENTS

Embodiment 1

One embodiment of the invention will be described based on FIG. 1 to FIG. 11 as follows.

[Configuration of Touch Panel System 1]

Figure 1:
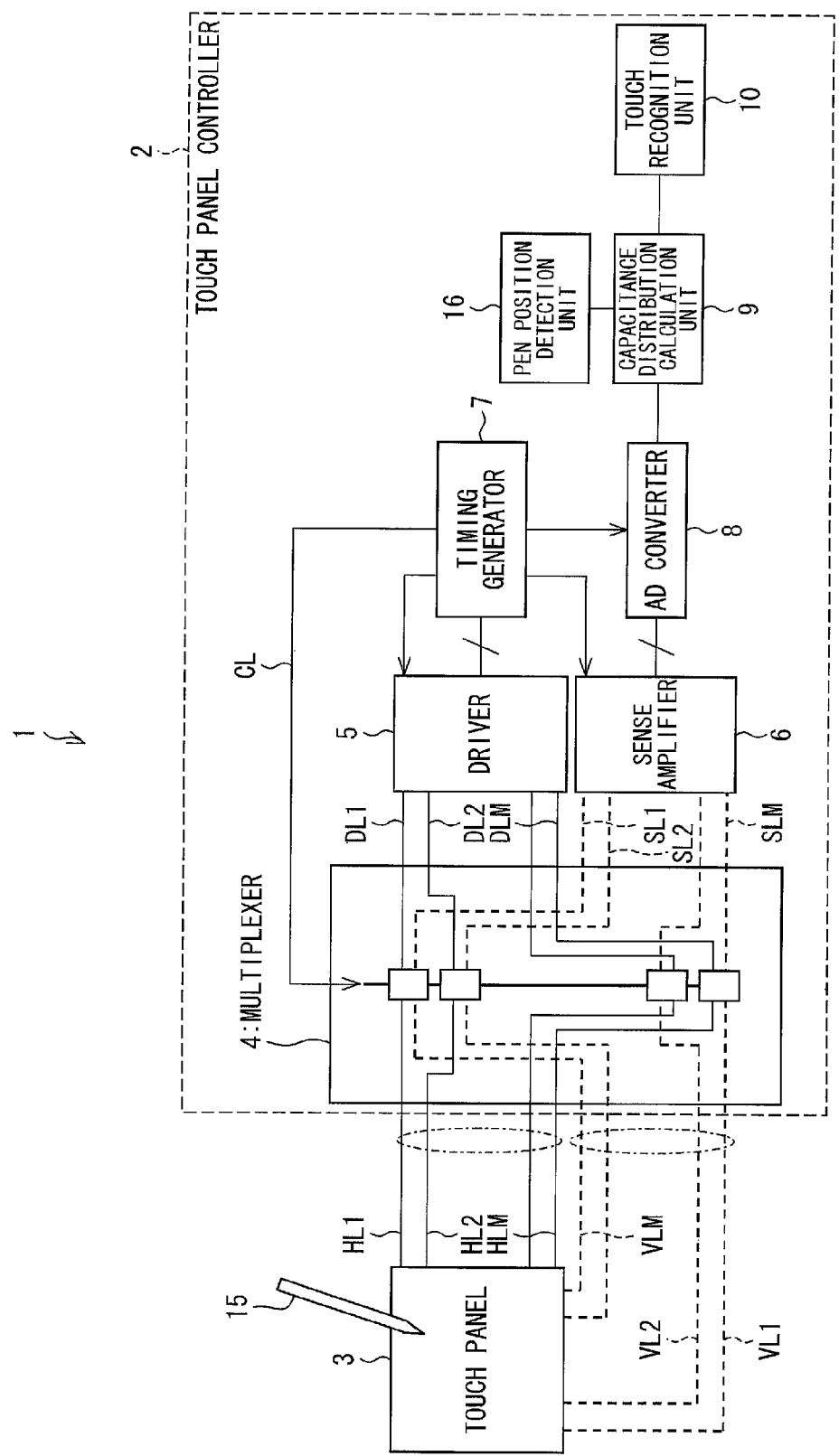
FIG. 1 is a block diagram illustrating a configuration of a touch panel system according to one embodiment of the invention.
Figure 2:
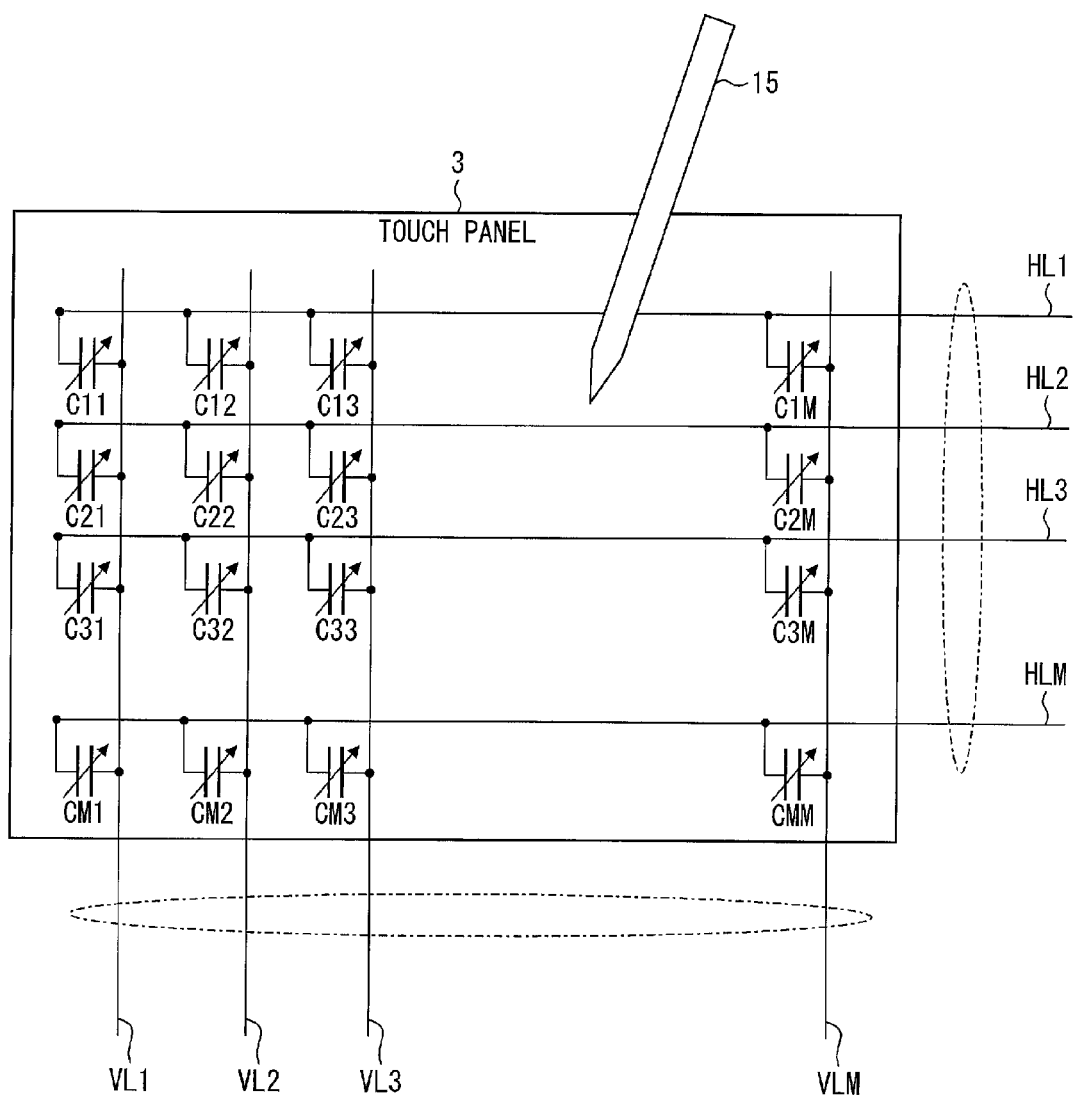
FIG. 2 is a schematic view illustrating a configuration of a touch panel provided in the touch panel system according to the one embodiment of the invention.

FIG. 1 is a block diagram illustrating a configuration of a touch panel system 1 according to the present embodiment. FIG. 2 is a schematic view illustrating a configuration of a touch panel 3 provided in the touch panel system 1.

The touch panel system 1 includes the touch panel 3, a touch panel controller 2, and a stylus pen 15, as illustrated in FIG. 1.

The touch panel 3 includes a plurality of signal lines VL1 to VLM (second signal lines) which are arranged in parallel to each other along a vertical direction, a plurality of signal lines HL1 to HLM (first signal lines) which are arranged in parallel to each other along a horizontal direction, and electrostatic capacitances C11 to CMM which are respectively formed at intersections of the signal lines HL1 to HLM and the signal lines VL1 to VLM, as illustrated in FIG. 2. The touch panel 3 preferably has an area in which a hand gripping the stylus pen 15 is able to be put, but may have a size used for a smartphone.

[Touch Panel Controller 2]

As illustrated in FIG. 1, the touch panel controller 2 includes a multiplexer 4, a driver 5, a sense amplifier 6, a timing generator 7, an AD converter 8, a capacitance distribution calculation unit 9 (position detection means), a touch recognition unit 10 (position detection means), and a pen position detection unit 16.

(Driver 5)

The driver 5 applies a voltage to drive lines DL1 to DLM based on M code sequences among (M+2) code sequences having a length of N. Moreover, the driver 5 supplies the remaining two code sequences among the (M+2) code sequences having the length of N to the stylus pen 15.

Note that, a method of supplying the code sequences from the driver 5 to the stylus pen 15 is not particularly limited. For example, in the case of connecting the touch panel controller 2 and the stylus pen 15 by cable, the supply may be performed by wired communication, and in the case of connecting by radio, the supply may be performed by radio communication.

The driver 5 drives the signal lines HL1 to HLM in parallel, and drives the signal lines VL1 to VLM in parallel.

(Sense Amplifier 6)

In a first driving step, the sense amplifier 6 reads, through sense lines SL1 to SLM, a linear sum signal corresponding to charges corresponding to the respective electrostatic capacitances C11 to CMM and charges corresponding to electrostatic capacitances between the stylus pen 15 and the respective M signal lines VL1 to VLM (first pen signal) to supply to the AD converter 8.

In a second driving step, the sense amplifier 6 reads, through the sense lines SL1 to SLM, a linear sum signal corresponding to the charges corresponding to the respective electrostatic capacitances C11 to CMM and charges corresponding to electrostatic capacitances between the stylus pen 15 and the respective M signal lines HL1 to HLM (second pen signal) to supply to the AD converter 8.

(Multiplexer 4)

Figure 3:
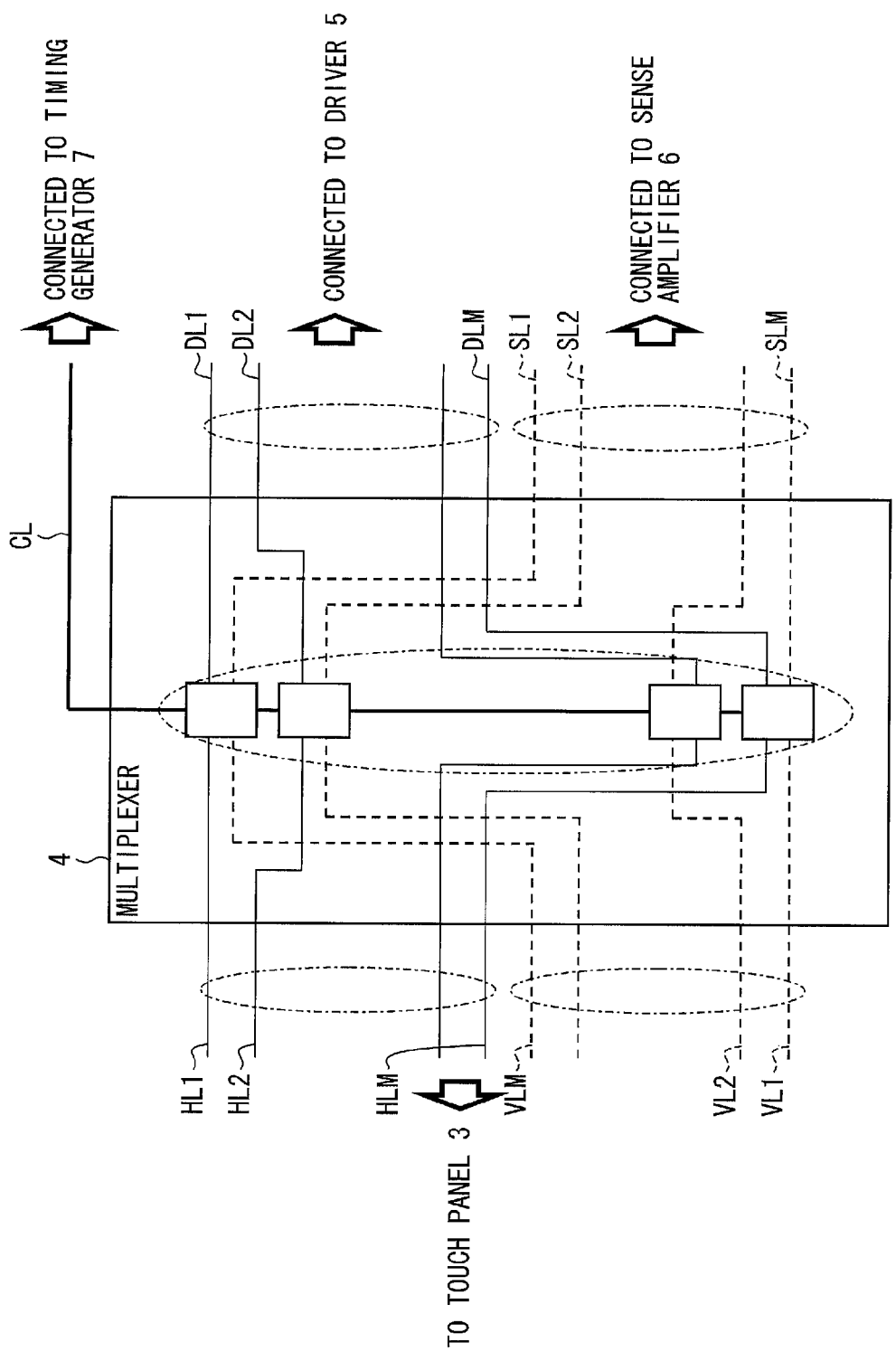
FIG. 3 is a circuit diagram illustrating a configuration of a multiplexer for switching connection of signal lines connected to the touch panel between drive lines connected to a driver and sense lines connected to a sense amplifier according to the one embodiment of the invention.

The multiplexer 4 will be described with reference to FIG. 3 and FIG. 4. FIG. 3 is a circuit diagram illustrating a configuration of a connection switching circuit of the signal lines HL1 to HLM and VL1 to VLM connected to the touch panel 3 between the drive lines DL1 to DLM connected to the driver 5 and the sense lines SL1 to SLM connected to the sense amplifier 6.

The multiplexer 4 switches a first connection state where the signal lines HL1 to HLM are connected to the drive lines DL1 to DLM of the driver 5 and the signal lines VL1 to VLM are connected to the sense lines SL1 to SLM of the sense amplifier 6, and a second connection state where the signal lines HL1 to HLM are connected to the sense lines SL1 to SLM of the sense amplifier 6 and the signal lines VL1 to VLM are connected to the drive lines DL1 to DLM of the driver 5.

Figure 4:
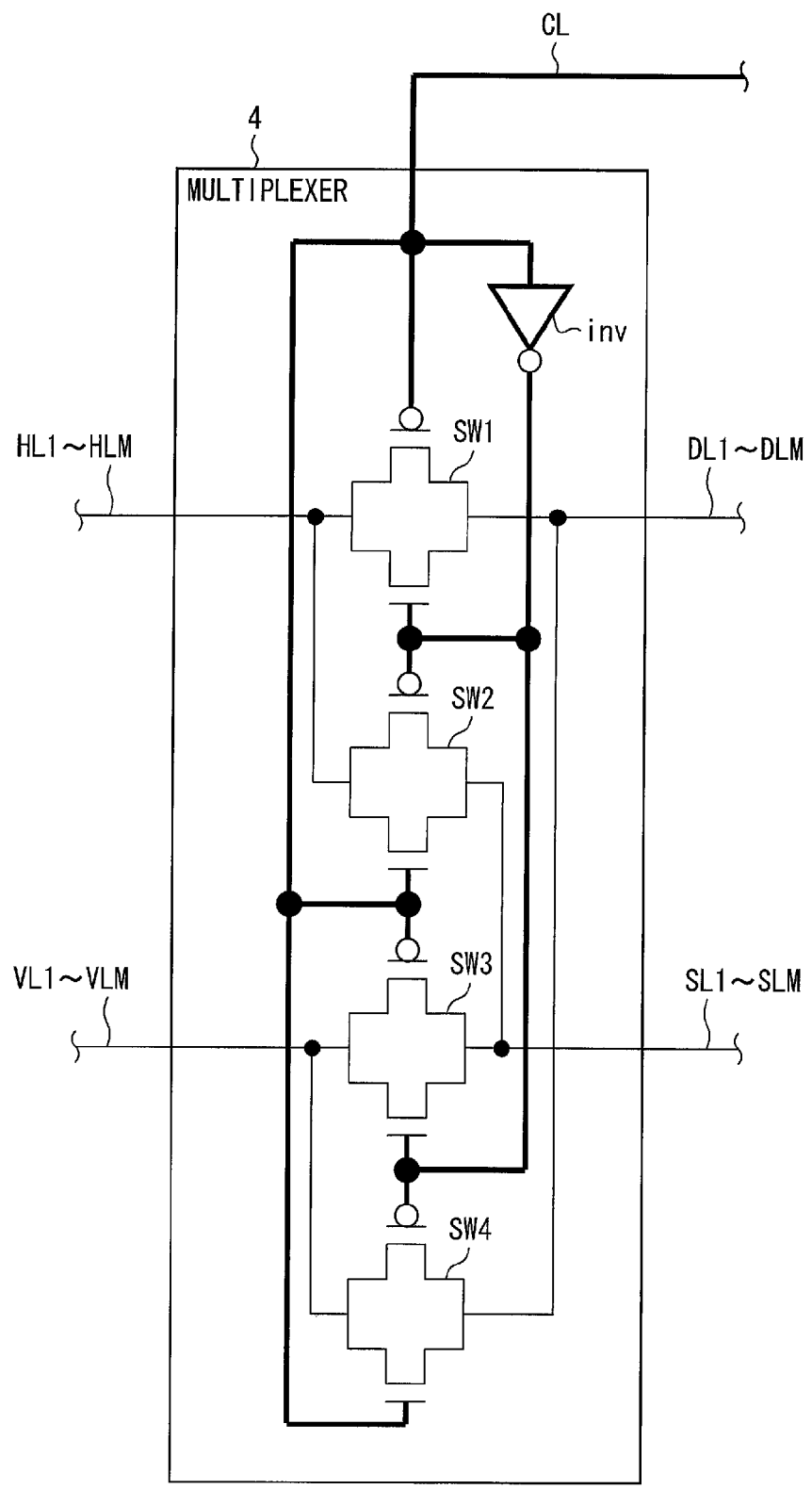
FIG. 4 is a circuit diagram illustrating a detailed configuration of the multiplexer according to one embodiment of the invention.

FIG. 4 is a circuit diagram showing a configuration of the multiplexer 4 provided in the touch panel controller 2 of the touch sensor system 1.

The multiplexer 4 has four CMOS switches SW1 to SW4 which are connected in series. A control line CL from the timing generator 7 is connected to a gate of a PMOS of the CMOS switch SW1, a gate of an NMOS of the CMOS switch SW2, a gate of a PMOS of the CMOS switch SW3, a gate of an NMOS of the CMOS switch SW4, and an input of an inverter inv. An output of the inverter inv is connected to a gate of an NMOS of the CMOS switch SW1, a gate of a PMOS of the CMOS switch SW2, a gate of an NMOS of the CMOS switch SW3, and a gate of a PMOS of the CMOS switch SW4. The signal lines HL1 to HLM are connected to the CMOS switches SW1 and SW2. The signal lines VL1 to VLM are connected to the CMOS switches SW3 and SW4. The drive lines DL1 to DLM are connected to the CMOS switches SW1 and SW4. The sense lines SL1 to SLM are connected to the CMOS switches SW2 and SW3.

When a signal of the control line CL is set to be Low, the signal lines HL1 to HLM are connected to the drive lines DL1 to DLM and the signal lines VL1 to VLM are connected to the sense lines SL1 to SLM. When the signal of the control line CL is set to be High, the signal lines HL1 to HLM are connected to the sense lines SL1 to SLM and the signal lines VL1 to VLM are connected to the drive lines DL1 to DLM.

(AD Converter 8)

In the first driving step, the AD converter 8 performs AD conversion for the linear sum signal corresponding to the charges corresponding to the respective electrostatic capacitances C11 to CMM and the charges corresponding to the electrostatic capacitances between the stylus pen 15 and the respective M signal lines VL1 to VLM (first pen signal), which are read through the signal lines VL1 to VLM and the sense lines SL1 to SLM, to supply to the capacitance distribution calculation unit 9.

In the second driving step, the AD converter 8 performs AD conversion for the linear sum signal corresponding to the charges corresponding to the respective electrostatic capacitances C11 to CMM and the charges corresponding to the electrostatic capacitances between the stylus pen 15 and the respective M signal lines HL1 to HLM (second pen signal), which are read through the signal lines HL1 to HLM and the sense lines SL1 to SLM, to supply to the capacitance distribution calculation unit 9.

(Capacitance Distribution Calculation Unit 9 and Touch Recognition Unit 10)

The capacitance distribution calculation unit 9 and the touch recognition unit 10 detect a position of the stylus pen 15 (target object) which touches the touch panel 3.

Specifically, based on the linear sum signals including the first pen signal and the second pen signal, and the (M+2) code sequences having the length of N, the capacitance distribution calculation unit 9 calculates (1) distribution of the electrostatic capacitances on the touch panel 3, (2) distribution of the electrostatic capacitances between the stylus pen 15 and the respective M signal lines VL1 to VLM, and (3) distribution of the electrostatic capacitances between the stylus pen 15 and the respective M signal lines HL1 to HLM. Moreover, the capacitance distribution calculation unit 9 supplies the calculated distribution of the electrostatic capacitances on the touch panel 3 to the touch recognition unit 10, and supplies the distribution of the electrostatic capacitances between the stylus pen 15 and the respective M signal lines VL1 to VLM and the distribution of the electrostatic capacitances between the stylus pen 15 and the respective M signal lines HL1 to HLM to the pen position detection unit 16.

The touch recognition unit 10 recognizes a touched position on the touch panel 3 based on the distribution of the electrostatic capacitances supplied from the capacitance distribution calculation unit 9.

(Pen Position Detection Unit 16)

The pen position detection unit 16 detects a position of the stylus pen 15 along the signal line HL1 based on the distribution of the electrostatic capacitances between the stylus pen 15 and the respective M signal lines VL1 to VLM. The pen position detection unit 16 further detects a position of the stylus pen 15 along the signal line VL1 based on the distribution of the electrostatic capacitances between the stylus pen 15 and the respective M signal lines HL1 to HLM.

(Timing Generator 7)

The timing generator 7 generates a signal defining an operation of the driver 5, a signal defining an operation of the sense amplifier 6 and a signal defining an operation of the AD converter 8 to supply to the driver 5, the sense amplifier 6 and the AD converter 8.

Moreover, the timing generator 7 generates a synchronization signal in order to synchronize an operation of the stylus pen 15 and an operation of the touch panel controller 2, and supplies the generated synchronization signal to the stylus pen 15. Note that, in a case where the touch panel controller 2 and the stylus pen 15 are connected by cable, the timing generator 7 may supply the synchronization signal to the stylus pen 15 by wired communication. In a case where the touch panel controller 2 and the stylus pen 15 are connected by radio, the synchronization signal may be supplied to the stylus pen 15 by radio communication.

In a sense mode for achieving synchronization with the operation of the stylus pen 15, the touch panel controller 2 drives the touch panel 3 with the synchronization signal. At this time, upon acquirement of the synchronization with the touch panel controller 2 with the synchronization signal supplied from the touch panel controller 2, the stylus pen 15 drives a pen point 38 at a driving timing which is determined in advance. Note that, driving of the stylus pen 15 will be described below in detail.

In a manner described above, the touch panel controller 2 drives the signal lines HL1 to HLM in parallel and drives the signal lines VL1 to VLM in parallel by respective units including the driver 5.

[Stylus Pen 15]

Figure 5:
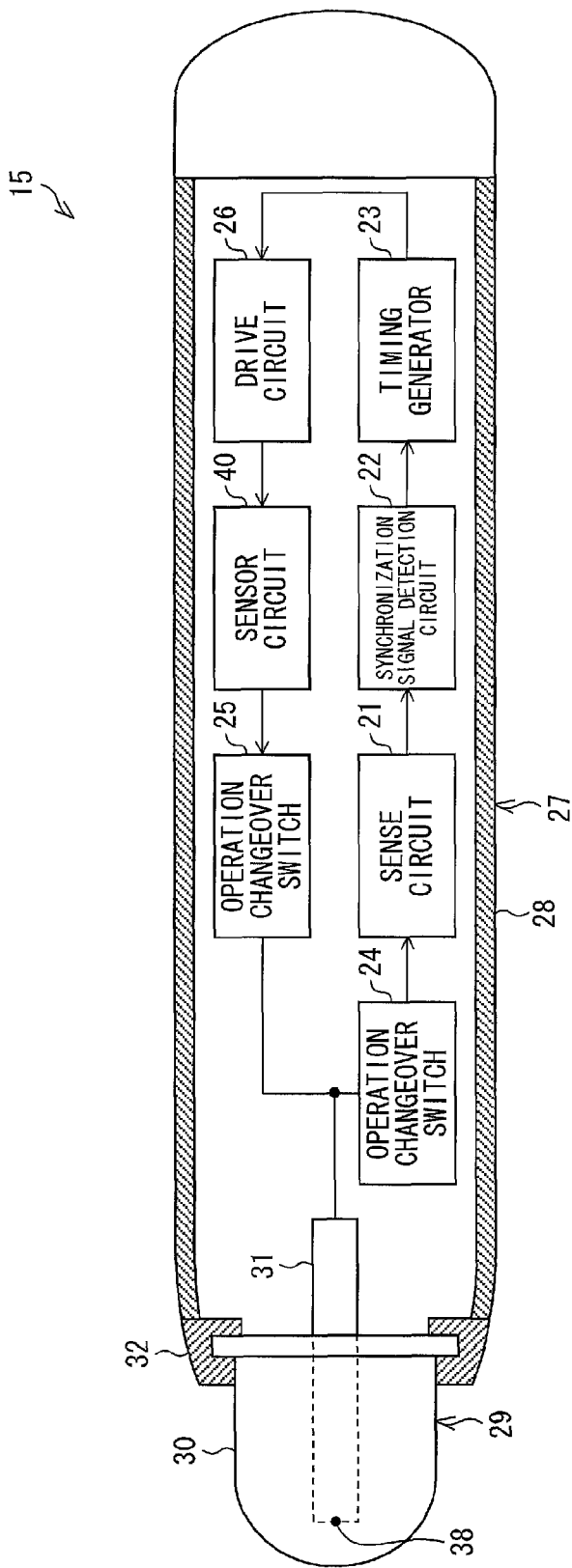
FIG. 5 is a block diagram schematically illustrating a configuration of a stylus pen provided in the touch panel system according to one embodiment of the invention.

Next, a configuration of the stylus pen 15 will be described with reference to FIG. 5. FIG. 5 is a block diagram schematically illustrating the configuration of the stylus pen 15 provided in the touch panel system 1.

As illustrated in FIG. 5, the stylus pen 15 includes a pen main body 27 having a conductive grip unit 28, which is formed in a substantially cylindrical shape in order to be gripped by a user with his/her hand, and a pen point unit 29 which is pushed against the touch panel 3 at a time of a touch operation.

(Pen Point Unit 29)

The pen point unit 29 has a pen point cover 30 and a pen point axis 31. The pen point axis 31 has a pen point 38 at a tip thereof. The pen point cover 30 is formed with a conductive felt material and the pen point axis 31 is formed with a conductive synthetic resin.

The pen point unit 29 is held by the pen main body 27 through an insulating body 32. The pen point axis 31 is supported by a guide member which is movable in an axis direction (not illustrated). When the pen point unit 29 is pushed against the touch panel 3 at the time of the touch operation, the pen point cover 30 formed with the felt material is depressed and the pen point axis 31 is pressed into the touch panel 3.

(Pen Main Body 27)

The pen main body 27 of the stylus pen 15 has a sense circuit 21 (synchronization circuit), a synchronization signal detection circuit 22 (synchronization circuit), a timing generator 23 (synchronization circuit), operation changeover switches 24 and 25, a drive circuit 26 (driving circuit), and a sensor circuit 40 (multiplexing circuit).

(Drive Circuit 26)

In synchronization with the driver 5 included in the touch panel controller 2, the drive circuit 26 generates two driving voltages (first driving voltage and second driving voltage) from two remaining code sequences (first code sequence and second code sequence) among (M+2) code sequences. Specifically, the drive circuit 26 generates the first driving voltage based on the first code sequence and the second driving voltage based on the second code sequence. The drive circuit 26 applies the two generated driving voltages to the sensor circuit 40.

The stylus pen 15 acquires a synchronization signal from the touch panel controller 2 with the sense circuit 21, and supplies the synchronization signal to the synchronization signal detection circuit 22. Upon acquirement of synchronization with the touch panel controller 2 by the synchronization signal detection circuit 22, the timing generator 23 drives the drive circuit 26 at a driving timing which is determined in advance. The drive circuit 26 applies the two driving voltages generated from the two code sequences to the sensor circuit 40, and the sensor circuit 40 drives the pen point 38 with a multiplexed voltage obtained by multiplexing the two applied driving voltages.

(Sensor Circuit 40)

Figure 6:
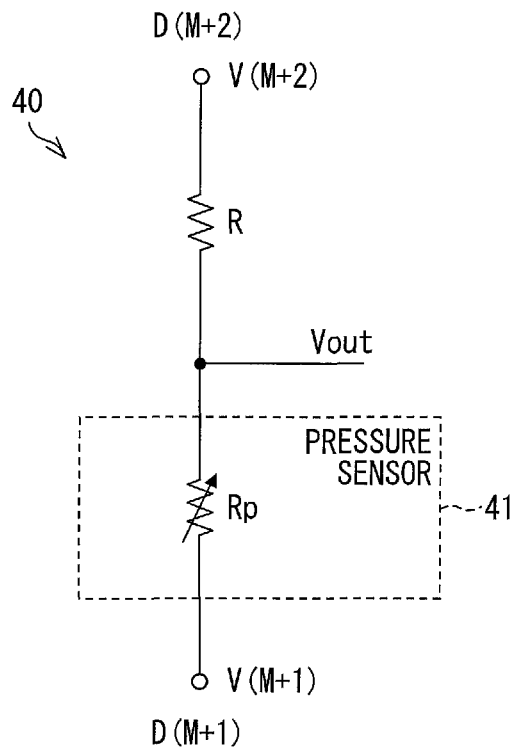
FIG. 6 is a circuit diagram illustrating a sensor circuit provided in the stylus pen according to one embodiment of the invention.

The sensor circuit 40 drives the pen point 38 of the stylus pen 15 with the multiplexed voltage obtained by multiplexing the two driving voltages supplied from the drive circuit 26. The sensor circuit 40 is a voltage dividing circuit having a pressure sensor 41 for detecting a writing pressure, as illustrated in FIG. 6. FIG. 6 is a circuit diagram illustrating a sensor circuit 40 provided in the stylus pen 15.

As illustrated in FIG. 6, the pressure sensor 41 has a variable resistor Rp whose resistance value changes according to a pressure when the stylus pen 15 makes contact with the touch panel 3 (writing pressure) (information regarding the stylus pen (additional information)), and detects the writing pressure as a resistance value of the variable resistor Rp. The sensor circuit 40 further includes a resistor R (fixed resistor), as illustrated in FIG. 6.

One end of the variable resistor Rp and one end of the resistor R are connected to an output terminal Vout. The other end of the variable resistor Rp is connected to a terminal D(M+1) (first terminal), and the other end of the resistor R is connected to a terminal D(M+2) (second terminal).

Figure 7:
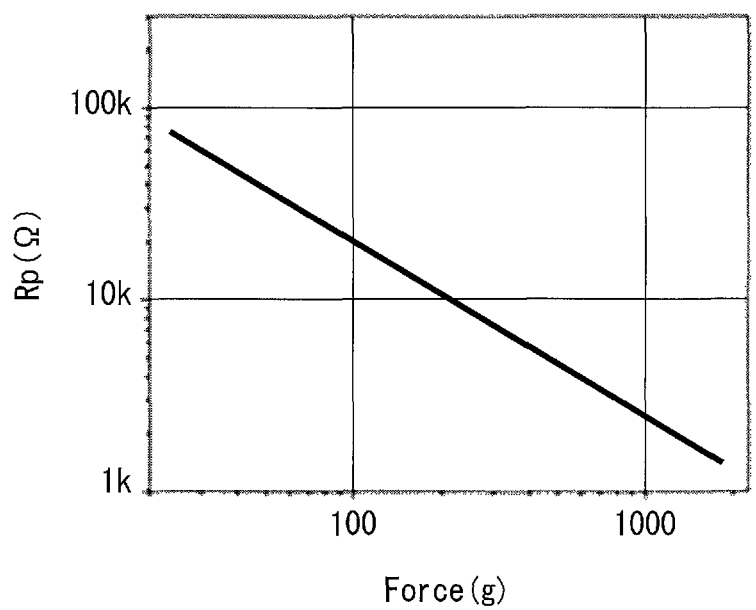
FIG. 7 is a graph indicating a characteristic of a pressure sensor included in the stylus pen according to one embodiment of the invention.

Note that, the pressure sensor 41 in the present embodiment has a characteristic that a value of the variable resistor Rp becomes small as a pressure which is detected is high, as illustrated in FIG. 7. FIG. 7 is a graph indicating the characteristic of the pressure sensor 41 included in the stylus pen 15 according to the present embodiment.

(Driving of Pen Point 38)

Driving of the pen point 38 by the drive circuit 26 and the sensor circuit 40 will be described here.

The drive circuit 26 applies the first driving voltage V(M+1) and the second driving voltage V(M+2) which are respectively generated from the two remaining code sequences among the (M+2) code sequences having the length of N to each of the terminals D(M+1) and D(M+2) which are included in the sensor circuit 40. The sensor circuit 40 supplies a multiplexed voltage Vout obtained by multiplexing the voltage V(M+1) applied to the terminal D(M+1) and the voltage V(M+2) applied to the terminal D(M+2) (that is, pressure-dividing with the variable resistor Rp and the resistor R) to the pen point 38 from the output terminal Vout through the operation changeover switch 25.

At this time, the multiplexed voltage Vout output from the sensor circuit 40 in order to drive the pen point 38 is expressed by a following formula (1).

$$V\text{out} = \{R \times V(M+1) + Rp \times V(M+2)\}/(R+Rp) \quad (1)$$

According to the formula (1), from the first driving voltage V(M+1) and the second driving voltage V(M+2) which are applied from the drive circuit 26 to the sensor circuit 40, the multiplexed voltage Vout is to be defined by a ratio of R:Rp. In other words, the multiplexed voltage Vout changes according to a writing pressure (value of the variable resistor Rp) detected by the pressure sensor 41. Note that, it may be configured that the resistor R illustrated in FIG. 6 is also a variable resistor and a value of R+Rp is fixed.

The touch panel controller 2 is able to estimate the writing pressure from a decoded result of the multiplexed voltage Vout with which the pen point 38 of the stylus pen 15 is driven.

With the configuration above, the sensor circuit 40 drives the pen point 38 of the stylus pen 15 with the multiplexed voltage output by multiplexing the two driving voltages with the resistor R and the variable resistor Rp. Thus, the stylus pen 15 does not need to transmit a code indicating pressure information and a code for detecting a position with a time difference nor to have high withstanding voltage performance nor high oscillation performance of a frequency.

[Operation of Touch Panel System 1]

Figure 8:
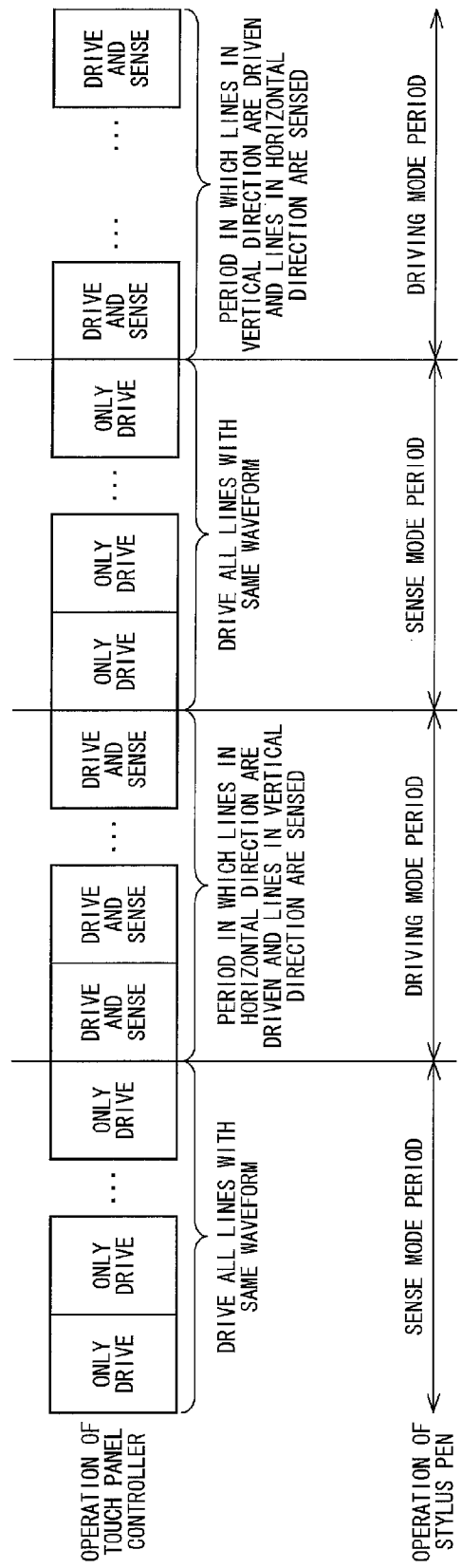
FIG. 8 is a diagram for explaining a correlation between a driving operation of a touch panel controller and a driving operation of the stylus pen, which are provided in the touch panel system according to one embodiment of the invention.

FIG. 8 is a diagram for explaining a correlation between a driving operation of the touch panel controller 2 and a driving operation of the stylus pen 15.

A period of the driving operation of the stylus pen 15 includes a sense mode period for detecting the synchronization signal from the touch panel controller 2 by the synchronization signal detection circuit 22 and a driving mode period for driving the pen point 38 by the drive circuit 26. During a period in which the touch panel controller 2 outputs the synchronization signal, the driver 5 drives all the drive lines or all the lines (HL1 to HLM and VL1 to VLM in the example of FIG. 2) with the same waveform (synchronization signal). Note that, a configuration for driving all the lines with the same waveform will be described below in detail.

When the synchronization signal detection circuit 22 detects the synchronization signal from the touch panel controller 2, the stylus pen 15 shifts to the driving mode period.

At this time, the touch panel controller 2 drives the signal lines HL1 to HLM after the period in which the synchronization signal for driving all the lines with the same waveform (synchronization signal) is output ends. That is, shifting is performed to a period when the lines in the horizontal direction (signal lines HL1 to HLM) are driven and the lines in the vertical direction (signal lines VL1 to VLM) are sensed. Further, shifting is performed again to the period when all the lines are driven with the same waveform (synchronization signal), and when the period ends, the signal lines VL1 to VLM are then driven. That is, shifting is performed to the driving mode period in which the lines in the vertical direction (signal lines VL1 to VLM) are driven and the lines in the horizontal direction (signal lines HL1 to HLM) are sensed.

During the driving mode period, the drive circuit 26 of the stylus pen 15 drives the pen point 38 in synchronization with the driving of the touch panel controller 2.

[Multiplexing of Codes]

Figure 9:
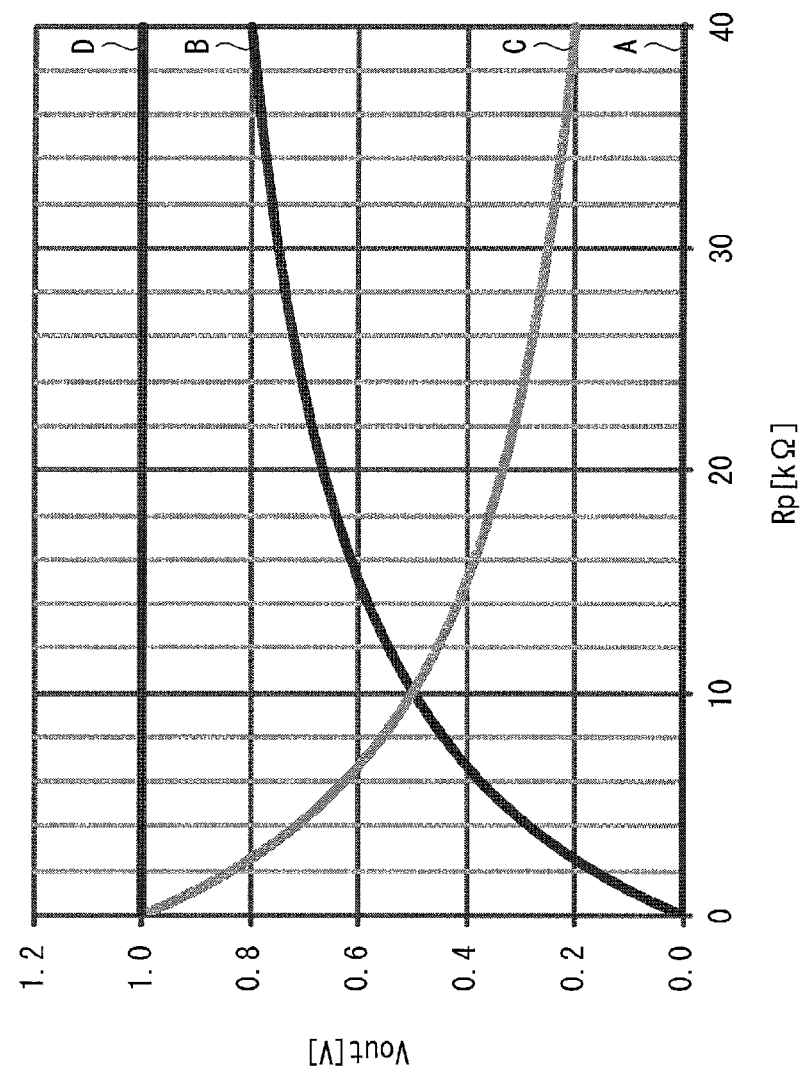
FIG. 9 is a graph indicating a characteristic of a value of an output voltage Vout of the sensor circuit with respect to a value of a variable resistor Rp in the sensor circuit according to one embodiment of the invention.

Next, description will be given for the multiplexed voltage applied to the pen point 38 of the stylus pen 15 with reference to FIG. 9. FIG. 9 is a graph indicating a characteristic of a value of an output voltage (multiplexed voltage Vout) of the sensor circuit 40 with respect to a value of the variable resistor Rp (that is, change in the writing pressure detected by the pressure sensor 41) in the sensor circuit 40 according to the present embodiment. Note that, an example of a case where R=10 (kΩ) will be described below.

As indicated by a graph A of FIG. 9, in a case where the first driving voltage V(M+1)=0 and the second driving voltage V(M+2)=0, a value of the multiplexed voltage Vout is fixed at 0 regardless of change in the value of the variable resistor Rp.

As indicated by a graph B, in a case where the first driving voltage V(M+1)=0 and the second driving voltage V(M+2)=1, the value of the multiplexed voltage Vout increases exponentially according to an increase of the value of the variable resistor Rp.

As indicated by a graph C, in a case where the first driving voltage V(M+1)=1 and the second driving voltage V(M+2)=0, the value of the multiplexed voltage Vout decreases exponentially according to an increase of the value of the variable resistor Rp.

As indicated by a graph D, in a case where the first driving voltage V(M+1)=1 and the second driving voltage V(M+2)=1, the value of the multiplexed voltage Vout is fixed at 1 regardless of change in the value of the variable resistor Rp.

The sensor circuit 40 drives the pen point 38 of the stylus pen 15 with the multiplexed voltage Vout obtained by multiplexing the first driving voltage V(M+1) and the second driving voltage V(M+2), as illustrated in FIG. 9.

(Detection of Multiplexed Driving Voltages in Touch Panel Controller 2)

As described above, the pen point 38 of the stylus pen 15 is driven with the multiplexed voltage obtained by multiplexing the two driving voltages. Thus, the distribution of the electrostatic capacitances between the stylus pen 15 and the respective signal lines VL1 to VLM and signal lines HL1 to HLM, which is detected by the pen position detection unit 16 of the touch panel controller 2, is also different from distribution of electrostatic capacitances of a case where the pen point 38 is driven with a driving voltage generated from one code sequence which is not multiplexed.

Detection (calculation) of writing pressure information in the touch panel controller 2 will be described below with reference to FIG. 10. Note that, FIG. 10 indicates a multiplexing characteristic of the stylus pen 15, which is detected and decoded in the touch panel controller 2 in a case where the driver 5 drives the touch panel 3 with an M sequence having a code length of 127.

First, driving of the touch panel system 1 using an M sequence will be described with reference to FIG. 14. FIG. 14 is a diagram for explaining a formula indicating a method of driving the touch panel system 1 in parallel by an M sequence code having a code length of 7.

Also by driving electrostatic capacitances in parallel by the M sequence code, the electrostatic capacitances are able to be estimated. As indicated by formulas (2) to (4), by obtaining an inner product of linear sum signals Y1 to Y7, electrostatic capacitances C1 to C7 are able to be estimated. In the present embodiment, an "M sequence" is one type of binary pseudo-random number sequences and composed of only binaries of 1 and −1 (or 1 and 0). A length of one cycle of the M sequence is $2^n-1$.

For obtaining the capacitance of Cn (n is 1 to 7), the touch panel controller 2 only may execute an operation indicated by the formula (4) of FIG. 14. That is, the touch panel controller 2 only may execute for a desired capacitance a product-sum operation which uses a code with which a capacitance desired to be obtained is driven.

Description will be specifically given for the case of obtaining C1. C1 is driven with −1 at a first time (when obtaining the linear sum signal Y1), driven with −1 at a second time (when obtaining the linear sum signal Y2), driven with +1 at a third time (when obtaining the linear sum signal Y3), driven with +1 at a fourth time (when obtaining the linear sum signal Y4), driven with +1 at a fifth time (when obtaining the linear sum signal Y5), driven with −1 at a sixth time (when obtaining the linear sum signal Y6), and driven with +1 at a seventh time (when obtaining the linear sum signal Y7).

In order to obtain a capacitance value of C1, it is set that, in a product-sum operation of decoding, since driving with −1, the linear sum signal Y1 becomes −Y1, since driving with −1, the linear sum signal Y2 becomes −Y2, since driving with +1, the linear sum signal Y3 becomes +Y3, since driving with +1, the linear sum signal Y4 becomes +Y4, since driving with +1, the linear sum signal Y5 becomes +Y5, since driving with −1, the linear sum signal Y6 becomes −Y6, and since driving with +1, the linear sum signal Y7 becomes +Y7. The aforementioned operation expresses a part of an operation in a right side of the formula (4).

When an operation of a part of the formula (4) is performed, $$7C1-C2-C3-C4-C5-C6-C7=-Y1-Y2+Y3+Y4+Y5-Y6+Y7$$

is provided. Here, since $$7C1-C2-C3-C4-C5-C6-C7 \approx 7C1,$$

$$7C1 \approx -Y1-Y2+Y3+Y4+Y5-Y6+Y7$$

is provided.

Similarly, in order to obtain the capacitance of C2, $$-C1+7C2-C3-C4-C5-C6-C7=Y1-Y2-Y3+Y4+Y5+Y6-Y7$$

is provided. Here, since $$-C1+7C2-C3-C4-C5-C6-C7 \approx 7C2,$$

$$7C2 \approx Y1-Y2-Y3+Y4+Y5+Y6-Y7$$

is provided.

To organize the aforementioned contents, with respect to a capacitance desired to be obtained, the touch panel controller 2 performs for the capacitance desired to be obtained a product-sum operation of linear sum signals by using codes with which driving have been performed. As a result thereof, a coefficient of a capacitance value desired to be obtained becomes 7, and coefficients of other capacitances become −1. The above is an example of the case of having the code length of 7, and in the case of having the code length of 127, a coefficient of a capacitance value desired to be obtained becomes 127, and coefficients of other capacitances become −1.

Figure 10:
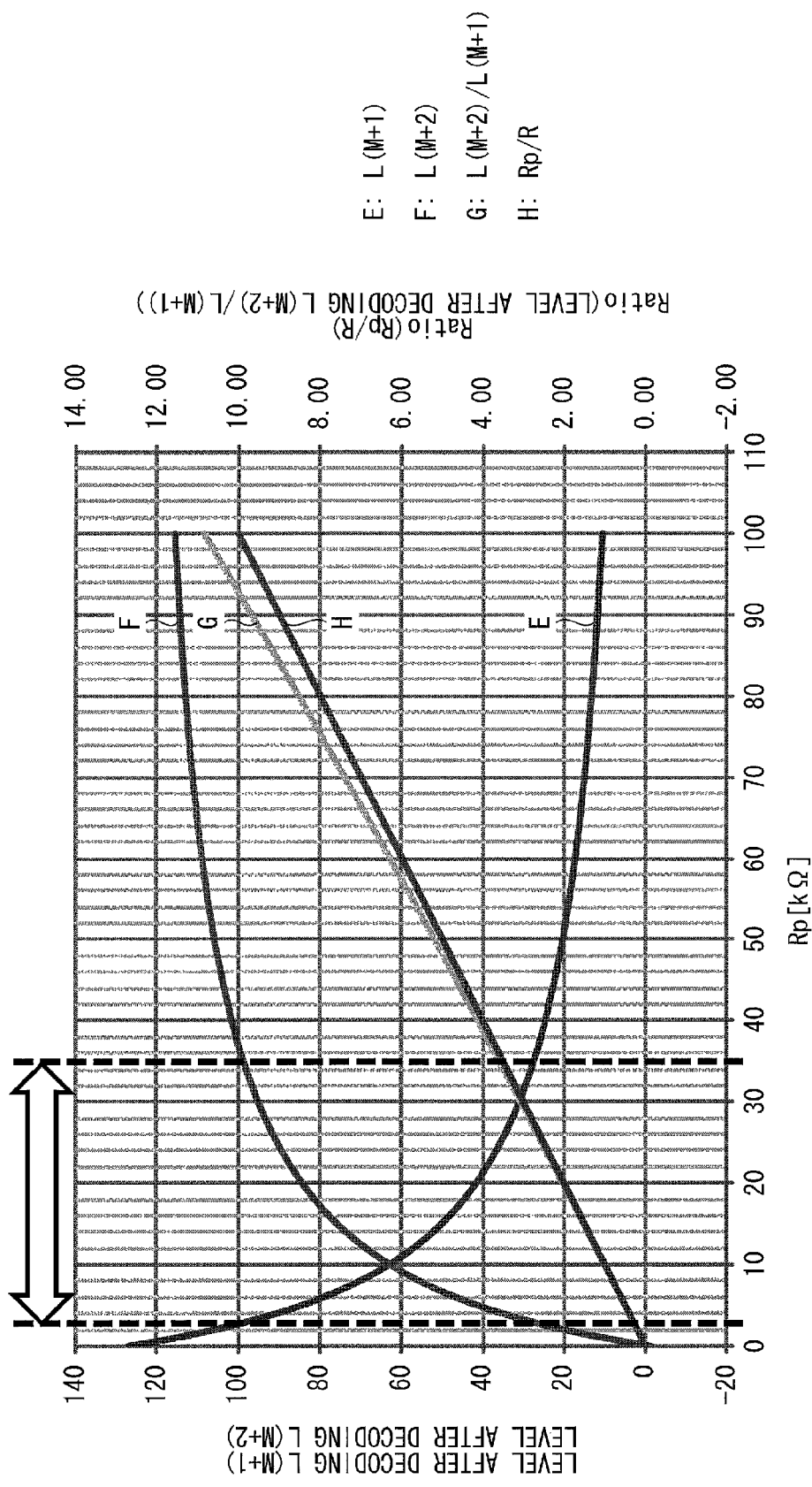
FIG. 10 is a graph indicating characteristics of a level after decoding (L(M+1)), which is obtained by decoding with a code with which a terminal D(M+1) is driven, and of a level after decoding (L(M+2)), which is obtained by decoding with a code with which a terminal D(M+2) is driven, with respect to the value of the variable resistor Rp, and characteristics of Rp/R and the level after decoding L(M+2)/the level after decoding L(M+1) with respect to the value of the variable resistor Rp.

FIG. 10 is a graph indicating characteristics of a level after decoding (L(M+1)), which is obtained by decoding with a code with which the terminal D(M+1) is driven, and of a level after decoding (L(M+2)), which is obtained by decoding with a code with which the terminal D(M+2) is driven, with respect to the value of the variable resistor Rp in a case where an M sequence having a code length of 127 is used for a driving code, and characteristics of Rp/R and the level after decoding L(M+2)/the level after decoding L(M+1) with respect to the value of the variable resistor Rp. FIG. 11 is a table indicating specific values of each curve in the graph illustrated in FIG. 10.

Note that, in the present embodiment, the M sequence having the code length of 127 is described also as an M127 sequence.

In FIG. 10, a graph E indicates a characteristic of the level after decoding (L(M+1)), which is obtained by decoding with the code with which the terminal D(M+1) is driven, with respect to the value of the variable resistor Rp when, in the sensor circuit 40, the code of D(M+1) supplied to the variable resistor Rp and the code of D(M+2) supplied to the resistor R are multiplexed to drive the pen point 38. The graph F indicates a characteristic of the level after decoding (L(M+2)), which is obtained by decoding with the code with which the terminal D(M+2) is driven, with respect to the value of the variable resistor Rp when, in the sensor circuit 40, the code of D(M+1) supplied to the variable resistor Rp and the code of D(M+2) supplied to the resistor R are multiplexed to drive the pen point 38.

Note that, a sum of values of the levels after decoding of the graph E and the graph F with respect to the variable resistor Rp having the same value, which is a sum of the level after decoding (L(M+1)), which is obtained by decoding with the code with which the terminal D(M+1) is driven, and the level after decoding (L(M+2)), which is obtained by decoding with the code with which the terminal D(M+2) is driven, is fixed as 126, as illustrated in FIG. 11.

As indicated by the graph E of FIG. 10 and by FIG. 11, in a case where the value of the variable resistor Rp is 0, the level after decoding (L(M+1))=127, which is detected in the touch panel controller 2 and which is obtained by decoding with the code with which the terminal D(M+1) is driven. Moreover, as the value of the variable resistor Rp increases, the level after decoding of the multiplexed voltage decreases exponentially.

As indicated by the graph F of FIG. 10 and by FIG. 11, in a case where the value of the variable resistor Rp is 0, the level after decoding (L(M+2))=−1, which is detected in the touch panel controller 2 and which is obtained by decoding with the code with which the terminal D(M+2) is driven. Moreover, as the value of the variable resistor Rp increases, the level after decoding of the multiplexed voltage increases exponentially.

Note that, as indicated by FIG. 10, when the variable resistor Rp=10 kΩ, Rp:R=50:50, and the levels after decoding of the graph E and the graph F become "63".

In addition, in FIG. 10, a graph G indicates a characteristic of a value of, with respect to the value of the variable resistor Rp, the level after decoding (L(M+2)), which is obtained by decoding with the code with which the terminal D(M+2) is driven/the level after decoding (L(M+1)), which is obtained by decoding with the code with which the terminal D(M+1) is driven, (ratio of the value of the level after decoding L(M+2) to the value of the level after decoding L(M+1)). A graph H indicates a characteristic of a value of Rp/R after decoding with respect to the value of the variable resistor Rp (ratio of the value of the variable resistor Rp to the resistor R).

Here, in the present embodiment, the drive lines DL1 to DLM are driven by using M code sequences among the (M+2) code sequences having the length of N, and the stylus pen 15 is driven by using the two remaining code sequences and decoded by using the aforementioned (M+2) code sequences having the length of N. Thus, as indicated in FIG. 10 and FIG. 11, in a case where the variable resistor Rp=0, L(M+2)=−1 exists, which expresses a wraparound component.

However, as indicated by the graph G and the graph H, though the wraparound component causes an error between a value of L(M+2)/L(M+1) and a value of the variable resistor Rp/the fixed resistor R, the error is at an ignorable degree within a range where the value of the variable resistor Rp is 3 kΩ to 35 kΩ.

Therefore, in the present embodiment, a range in which the pressure sensor 41 included in the stylus pen 15 is able to detect a writing pressure is set to a range of 50 g to 800 g, that is, a range in which the value of the variable resistor Rp is able to change is set to a range of 3 kΩ to 35 kΩ, as indicated by a bidirectional arrow of FIG. 10.

Note that, it may be configured that the value of the variable resistor Rp/the fixed resistor R is estimated by calculating a correction coefficient from a correlation between the value of L(M+2)/L(M+1) and the variable resistor Rp/the fixed resistor R, which are indicated in FIG. 11, and using the value of L(M+2)/L(M+1) and the correction coefficient.

[Calculation of Writing Pressure Information]

As indicated in FIG. 10 and FIG. 11, for example, in a case where the level after decoding (L(M+2)), which is obtained by decoding with the code with which the terminal D(M+2) is driven, is about 47 and the level after decoding (L(M+1)), which is obtained by decoding with the code with which the terminal D(M+1) is driven, is about 79, the value of L(M+2)/L(M+1) becomes around 0.59, so that the value of the variable resistor Rp is about 6 (kΩ). Moreover, in a case where the level after decoding (L(M+2)), which is obtained by decoding with the code with which the terminal D(M+2) is driven, is about 87 and the level after decoding (L(M+1)), which is obtained by decoding with the code with which the terminal D(M+1) is driven, is about 39, the value of L(M+2)/L(M+1) becomes around 2.23, so that the value of the variable resistor Rp is about 22 (kΩ). In such a manner, by calculating the value of the variable resistor Rp from the ratio of the level after decoding (L(M+1)), which is obtained by decoding with the code with which the terminal D(M+1) is driven, and the level after decoding (L(M+2)), which is obtained by decoding with the code with which the terminal D(M+2) is driven, the touch panel controller 2 is able to calculate a value of writing pressure information supplied from the stylus pen 15.

Thereby, the touch panel system 1 is able to supply the writing pressure information from the stylus pen 15 to the touch panel controller 2, with a simple configuration. In addition, from a signal based on the electrostatic capacitances between the pen point 38 of the stylus pen 15, which is driven with the multiplexed voltage, and the respective signal lines, the touch panel controller 2 is able to detect a position of the stylus pen 15 and also detect the writing pressure information.

Note that, though described in the present embodiment is an example of the configuration in which the value of the variable resistor Rp is calculated from the ratio of the level after decoding (L(M+1)), which is obtained by decoding with the code with which the terminal D(M+1) is driven, and the level after decoding (L(M+2)), which is obtained by decoding with the code with which the terminal D(M+2) is driven, the invention is not limited thereto. As the graph indicated in FIG. 10 or a table indicated in FIG. 11, a table in which the ratio of the level after decoding (L(M+1)), which is obtained by decoding with the code with which the terminal D(M+1) is driven, and the level after decoding (L(M+2)), which is obtained by decoding with the code with which the terminal D(M+2) is driven, and the variable resistor Rp are associated may be stored in a storage unit which is not illustrated. In this case, the touch panel controller 2 may acquire the writing pressure information by reading, from the table, the value of the variable resistor Rp associated with the ratio of the level after decoding (L(M+1)), which is obtained by decoding with the code with which the terminal D(M+1) is driven, and the level after decoding (L(M+2)), which is obtained by decoding with the code with which the terminal D(M+2) is driven.

Moreover, though an example of a case where M signal lines (VL1 to VLM) (second signal lines), the number of which is same as that of the signal lines HL1 to HLM, are included in the touch panel 3 has been described in the present embodiment for simplification of description, the invention is not limited thereto. For example, a configuration in which K signal lines (VL1 to VLK), the number of which is different from that of the signal lines HL1 to HLM, are provided may be adopted. In this case, (M×K) electrostatic capacitances C11 to CMK are formed at respective intersections of the signal lines HL1 to HLM and the signal lines VL1 to VLK.

Modified Example 1

Figure 12:
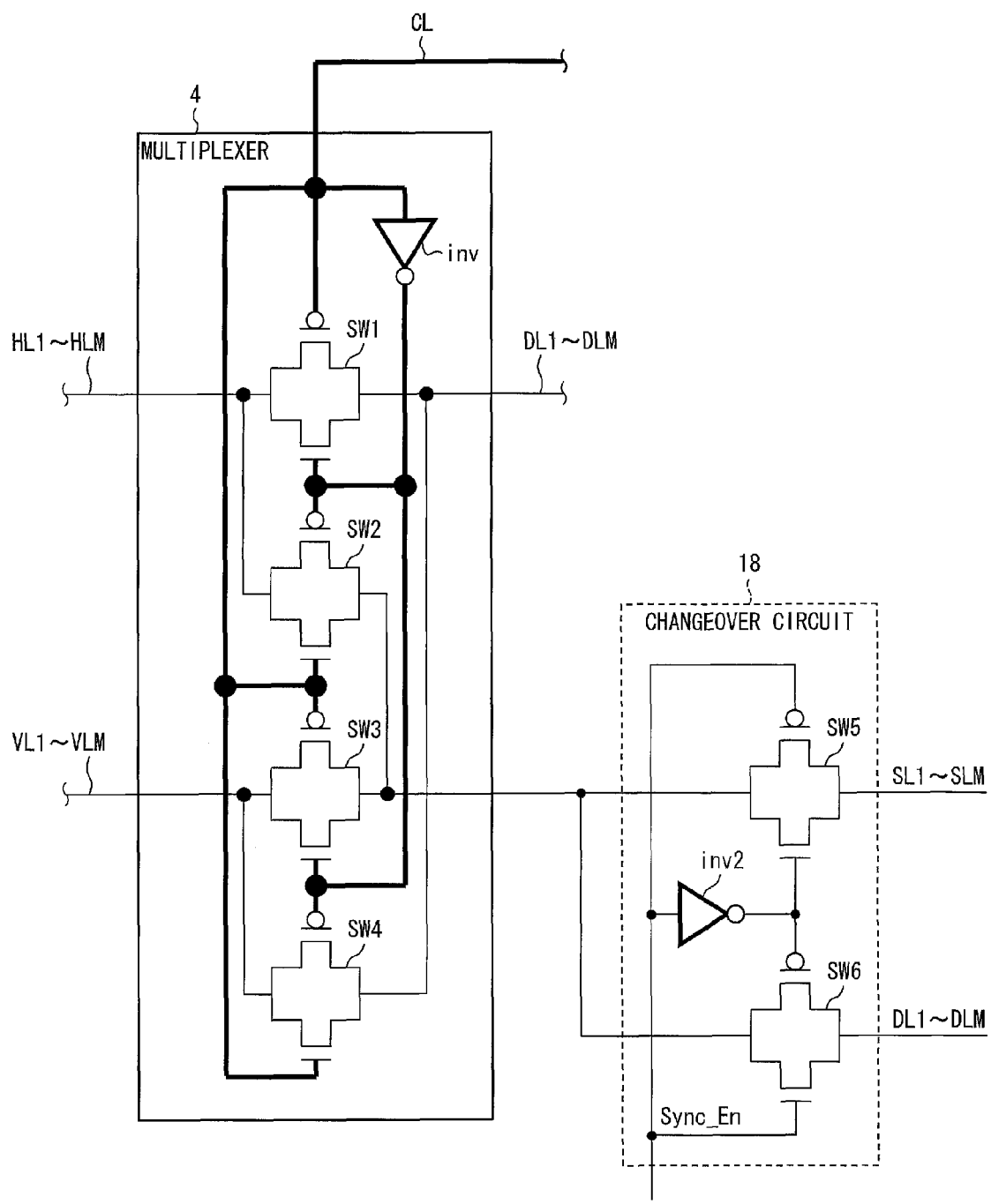
FIG. 12 is a block diagram illustrating configurations of the multiplexer and a changeover circuit included in the touch panel system according to one embodiment of the invention.

Here, a configuration of a modified example in which all the lines are driven with the same waveform (synchronization signal) in the touch panel controller 2 will be described with reference to FIG. 12. As illustrated in FIG. 12, the touch panel controller 2 according to the present embodiment includes a changeover circuit 18 in order to drive all the lines with the same waveform. FIG. 12 is a block diagram illustrating configurations of the multiplexer 4 and the changeover circuit 18 included in the touch panel controller 2 according to the present embodiment.

Note that, in order to facilitate a sense operation of the stylus pen 15, the touch panel controller 2 may be composed to drive an entire surface (the signal lines VL1 to VLM and the signal lines HL1 to HLM) of the touch panel 3 as described above when the touch panel controller 2 outputs the synchronization signal. This is because it is possible to increase a level of a signal which is able to be obtained by the stylus pen 15 and the operation of the sense mode becomes more facilitated.

The changeover circuit 18 has two CMOS switches SW5 to SW6 which are connected in series. A control line Sync_En from the timing generator 7 is connected to a gate of a PMOS of the CMOS switch SW5, a gate of an NMOS of the CMOS switch SW6, and an input of an inverter inv2. An output of the inverter inv2 is connected to a gate of an NMOS of the CMOS switch SW5 and a gate of a PMOS of the CMOS switch SW6. The signal line from the multiplexer 4 is connected to the CMOS switches SW5 and SW6. The drive lines DL1 to DLM are connected to the CMOS switch SW6. The sense lines SL1 to SLM are connected to the CMOS switch SW5.

In a configuration where both of the signal lines VL1 to VLM and the signal lines HL1 to HLM of the touch panel 3 are driven, the driver 5 drives the signal lines VL1 to VLM and the signal lines HL1 to HLM at the same time through the drive lines DL1 to DLM. As illustrated in FIG. 12, the changeover circuit 18 is added. The changeover circuit 18 connects the drive lines DL1 to DLM to the multiplexer 4 when the touch panel controller 2 outputs the synchronization signal to the stylus pen 15. As a result thereof, the drive lines DL1 to DLM are able to be connected to both of the signal lines VL1 to VLM and the signal lines HL1 to HLM.

At a timing of collecting capacitance information (when carrying out the first driving step and the second driving step), the sense lines SL1 to SLM are connected to the multiplexer 4 by the changeover circuit 18. As a result thereof, the first connection state where the drive lines DL1 to DLM are connected to the signal lines HL1 to HLM and the sense lines SL1 to SLM are connected to the signal lines VL1 to VLM and the second connection state where the drive lines DL1 to DLM are connected to the signal lines VL1 to VLM and the sense lines SL1 to SLM are connected to the signal lines HL1 to HLM are switched by the multiplexer 4.

Modified Example 2

Though an example of a configuration in which the stylus pen 15 includes the pressure sensor 41 and writing pressure information is supplied from the stylus pen 15 to the touch panel 3 (more specifically, to the touch panel controller 2 through the touch panel 3) as additional information will be described in the present embodiment, the invention is not limited thereto.

For example, it may be configured that the stylus pen 15 includes an inclination sensor (not illustrated) and information on inclination of the stylus pen 15 is supplied to the touch panel 3 as the additional information.

Moreover, it may be configured that the stylus pen 15 detects which position of the pen main body 27 a user grips and supplies a color according to the gripped position which is detected to the touch panel 3 as the additional information. Furthermore, the stylus pen 15 may include a button (not illustrated), and supply information indicating that the button has been pressed to the touch panel 3 as the additional information.

Note that, in the present modified example, a supplying method thereof is not particularly limited as long as having a configuration in which the additional information is supplied with a driving voltage changed according to a value of the additional information. For example, the driving voltage may be divided into 256 gradations, and the additional information may be supplied according to a ratio of the driving voltage and the additional information within the 256 gradations.

Modified Example 3

Though an example of a configuration in which the touch panel system 1 includes one stylus pen 15 has been described in the present embodiment, there is no limitation thereto, and, for example, a configuration in which a plurality of stylus pens 15 are included may be adopted.

In this case, one code sequence among the two code sequences having the length of N, which are supplied to each of the stylus pens 15, may be used in common.

For example, in the touch panel system 1 including two stylus pens 15, in the case of supplying the two code sequences having the length of N to each of the stylus pens 15, the touch panel controller 2 needs four code sequences in total in order to drive the stylus pens 15. Whereas, in a case where one code sequence among the two code sequences having the length of N is used in common, the touch panel controller 2 needs to prepare only three code sequences in total.

That is, in the touch panel system 1 which includes N (N is an integer of 2 or more) stylus pens 15, the touch panel controller 2 may drive the N stylus pens 15 with N+1 code sequences in total by using one code sequence among the two code sequences supplied to each of the stylus pens 15 in common.

Thereby, the touch panel system 1 is able to minimize an increase in the code sequences, which is in accordance with an increase in the number of the stylus pens 15.

Note that, in the aforementioned configuration, code sequences which are supplied to each of the stylus pens 15 for detecting touch positions on the touch panel 3 are set as, for example, D(M+1), D(M+2), and D(M+3). At this time, a first stylus pen drives the pen point 38 with a multiplexed voltage of two codes of D(M+1) and D(M+2), and the touch panel controller 2 calculates writing pressure information from a ratio of the level after decoding (L(M+1)), which is obtained by decoding with the code with which the terminal D(M+1) is driven, and the level after decoding (L(M+2)), which is obtained by decoding with the code with which the terminal D(M+2) is driven. A second stylus pen drives the pen point 38 with a multiplexed voltage of two codes of D(M+2) and D(M+3), and the touch panel controller 2 calculates writing pressure information from a ratio of the level after decoding (L(M+2)), which is obtained by decoding with the code with which the terminal D(M+2) is driven, and a level after decoding (L(M+3)), which is obtained by decoding with a code with which a terminal D(M+3) is driven. Thereby, even in a case where the plurality of stylus pens 15 touch the touch panel 3, each of the stylus pens 15 is able to be detected individually, and writing pressure information of each of the stylus pens 15 is also able to be detected.

Modified Example 4

Though an example of the configuration in which the touch panel system 1 includes one stylus pen 15 has been described in the present embodiment, the invention is not limited thereto, and a plurality of stylus pens 15 may be included. In addition, the touch panel system 1 may allow addition of the stylus pen 15 which is able to be used in the touch panel system 1. For example, it may be configured that, in the touch panel system 1 including one stylus pen 15, one stylus pen 15 is further added to thereby allow the touch panel system 1 to include two stylus pens 15.

However, as the number of the stylus pens 15 increases in the touch panel system 1, the number of code sequences to be supplied to each of the stylus pens 15 also increases. The increase in the number of code sequences becomes marked particularly in the case of supplying a plurality of pieces of the additional information from the stylus pens 15.

The touch panel controller 2 included in the touch panel system 1 according to the present modified example may shift to a pen-dedicated mode in which a code sequence is not supplied to the stylus pen 15 which exceeds a predetermined number in a case where the number of the stylus pens 15 exceeds the predetermined number due to the addition of the stylus pen 15, for example. That is, the stylus pen 15 which exceeds the predetermined number, which is the stylus pen 15 included in the touch panel system 1 according to the present modified example, is not driven with a code sequence. At this time, only the stylus pen 15 which exceeds the predetermined number may be set in the pen-dedicated mode, or all the stylus pens 15 may be set in the pen-dedicated mode.

With the aforementioned configuration, in the touch panel system 1, even in a case where the number of the stylus pens 15 is large, the stylus pen 15 which exceeds the predetermined number is able to be used as a conventional (not-driven) touch pen, while the stylus pen 15 up to the predetermined number is able to be driven with code sequences. Thereby, even in a case where the stylus pens 15 of more than the predetermined number are provided in the touch panel system 1, the touch panel controller 2 is able to receive touch operations of all the stylus pens 15.

Embodiment 2

Figure 13:
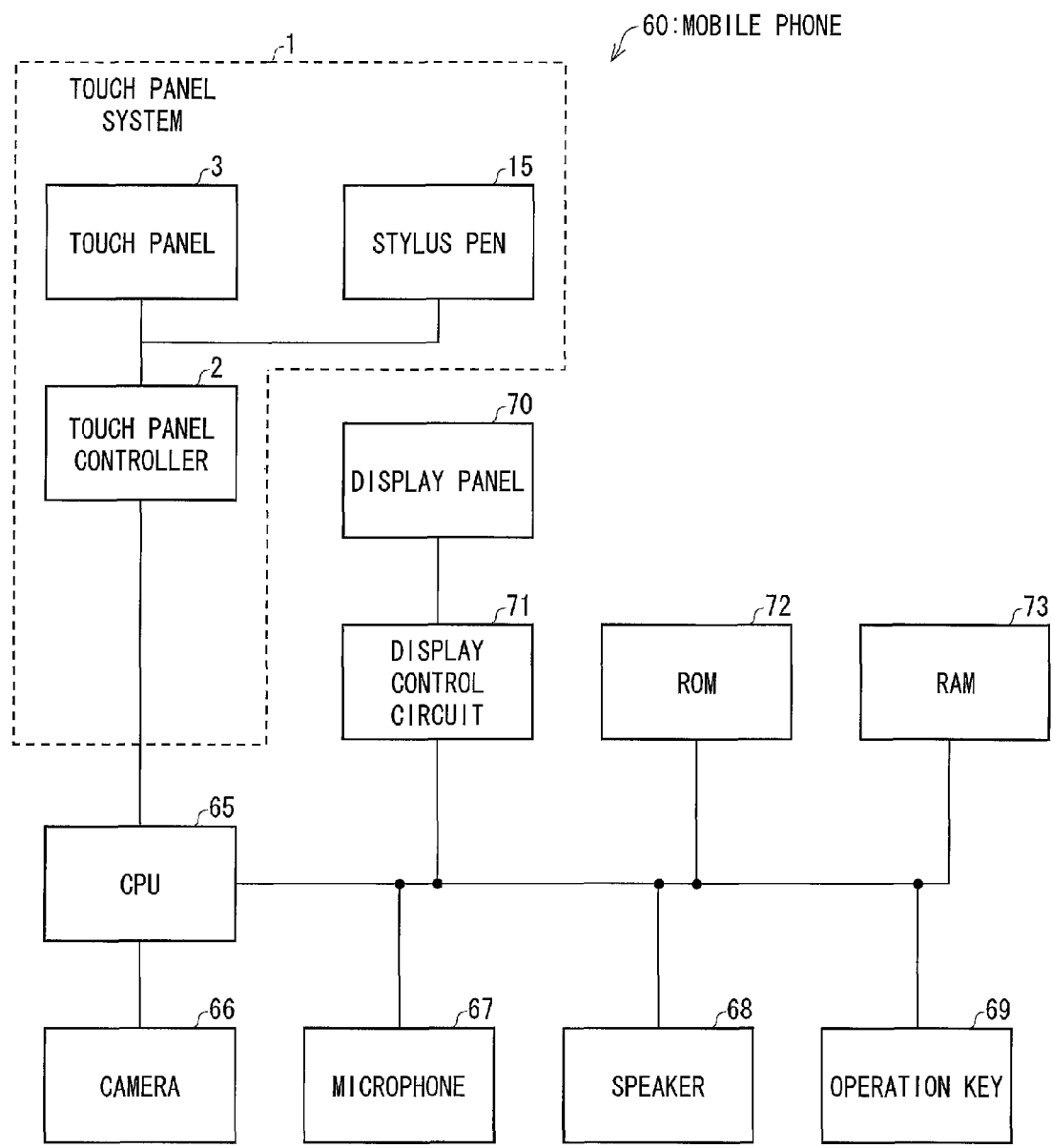
FIG. 13 is a block diagram illustrating a configuration of a mobile phone according to another embodiment of the invention.

Embodiment 2 of the invention will be described based on FIG. 13 as follows. FIG. 13 is a block diagram showing a configuration of a mobile phone 60 according to the present embodiment.

The mobile phone 60 (electronic device) includes a CPU 65, a RAM 73, a ROM 72, a camera 66, a microphone 67, a speaker 68, an operation key 69, a display panel 70, a display control circuit 71, and the touch panel system 1. Respective components are mutually connected by a data bus.

The CPU 65 controls an operation of the mobile phone 60. The CPU 65 executes, for example, a program stored in the ROM 72. The operation key 69 receives an input of an instruction by a user of the mobile phone 60. The RAM 73 stores data which is generated by execution of the program by the CPU 65 or data which is input through the operation key 69, in a volatile manner. The ROM 72 stores data in a non-volatile manner.

Further, the ROM 72 is a ROM which allows writing and deletion, such as an EPROM (Erasable Programmable Read-Only Memory) or a flash memory. Note that, though not illustrated in FIG. 13, the mobile phone 60 may be composed to include an interface (IF) for being connected with another electronic device by cable.

The camera 66 photographs an object according to an operation on the operation key 69 by the user. Image data of the object which is photographed is stored in the RAM 73 or an external memory (for example, memory card). The microphone 67 receives an input of a voice of the user. The mobile phone 60 digitizes the voice which is input (analog data). The mobile phone 60 then transmits the voice which is digitized to a communication target (for example, another mobile phone). The speaker 68 outputs a sound, for example, based on music data or the like stored in the RAM 73.

The touch panel system 1 has the touch panel 3, the touch panel controller 2 that detects an electrostatic capacitance or a difference of the electrostatic capacitance, and the stylus pen 15. The CPU 65 controls an operation of the touch panel system 1. The display panel 70 displays an image stored in the ROM 72 or the RAM 73 by the display control circuit 71. The display panel 70 is overlapped with the touch panel 3 or incorporates the touch panel 3. Note that, a touch recognition signal which is generated by the touch recognition unit 10 to indicate a touch position on the touch panel 3 may have the same function as that of a signal indicating that the operation key 69 is operated.

SUMMARY

A touch panel system (touch panel system 1) according to an aspect 1 of the invention is a touch panel system including: a stylus pen (stylus pen 15) for touching a touch panel (touch panel 3) which has M first signal lines (M is plural), K second signal lines (K is plural) which intersect with the M first signal lines, and (M×K) electrostatic capacitances formed at respective intersections of the first signal lines and the second signal lines; and a touch panel controller (touch panel controller 2) that detects a position of the stylus pen, in which the stylus pen includes a driving circuit (drive circuit 26) which generates a first driving voltage based on a first code sequence indicating one of (M+2) code sequences having a length of N (N is plural) and a second driving voltage based on a second code sequence indicating another one of the (M+2) code sequences having the length of N, and a multiplexing circuit (sensor circuit 40) which drives a pen point (pen point 38) of the stylus pen with a multiplexed voltage obtained by multiplexing the first driving voltage and the second driving voltage, and the multiplexing circuit has a variable resistor (variable resistor Rp) one end of which is connected to a first terminal to which the first driving voltage is applied and whose resistance value changes based on information regarding the stylus pen (writing pressure information or additional information), a fixed resistor (resistor R) one end of which is connected to a second terminal to which the second driving voltage is applied, and an output terminal which is connected to the other end of the fixed resistor and the other end of the variable resistor and which outputs the multiplexed voltage.

With the aforementioned configuration, the multiplexing circuit included in the stylus pen outputs, as the multiplexed voltage, the first driving voltage and the second driving voltage from the output terminal to which the fixed resistor and the variable resistor are connected, and drives the pen point of the stylus pen with the multiplexed voltage. That is, the stylus pen multiplexes two code sequences into one multiplexed voltage in the multiplexing circuit and drives the pen point with the multiplexed voltage.

Accordingly, in order to supply the information regarding the stylus pen (hereinafter, additional information) to the touch panel controller, the stylus pen does not need to transmit a code indicating the additional information and a code for detecting a position with a time difference. In addition, the stylus pen does not need to have high withstanding voltage performance nor high oscillation performance of a frequency.

Further, the touch panel controller is able to detect a position of the stylus pen and is also able to detect the additional information, from a voltage of the pen point of the stylus pen which is driven with the multiplexed voltage obtained by multiplexing the driving voltages based on the two code sequences.

Thereby, the touch panel system is able to supply the additional information from the stylus pen to the touch panel controller, with a simple configuration.

In a touch panel system according to an aspect 2 of the invention, the information regarding the stylus pen in the aspect 1 may be information indicating a writing pressure applied to the pen point (writing pressure information).

With the aforementioned configuration, the writing pressure applied to the pen point of the stylus pen is detected as the resistance value of the variable resistor as it is in the multiplexing circuit. That is, the multiplexing circuit is able to utilize the writing pressure applied to the pen point as the resistance value of the variable resistor as it is for multiplexing the two driving voltages.

Accordingly, even in a case where the writing pressure applied to the pen point suddenly changes, following the sudden change, the multiplexing circuit is able to change the multiplexed voltage.

In a touch panel system according to an aspect 3 of the invention, the touch panel controller in the aspect 1 or 2 includes: a driver that drives the M first signal lines with a synchronization signal in a sense mode period and thereafter drives the M first signal lines based on a code sequence in a driving mode period to output a first linear sum signal based on charges, which are accumulated in the electrostatic capacitances, along the K second signal lines, and drives the K second signal lines with the synchronization signal in a next sense mode period and thereafter drives the K second signal lines based on the code sequence in a next driving mode period to output a second linear sum signal based on the charges, which are accumulated in the electrostatic capacitances, along the M first signal lines; and position detection means (capacitance distribution calculation unit 9, touch recognition unit 10) that detects a position of a target, which has touched the touch panel, based on the first linear sum signal and the second linear sum signal, the stylus pen includes a synchronization circuit (sense circuit 21, synchronization signal detection circuit 22, timing generator 23) that receives the synchronization signal, and the driving circuit generates the first driving voltage and the second driving voltage based on an output of the synchronization circuit.

With the aforementioned configuration, the multiplexing circuit drives the pen point with the multiplexed voltage obtained by multiplexing the first driving voltage and the second driving voltage which are generated by the driving circuit based on the output of the synchronization circuit. Therefore, the stylus pen is able to excellently drive the pen point in synchronization with driving of the first signal lines or the second signal lines by the touch panel controller.

In a touch panel system according to an aspect 4 of the invention, in the aspect 3, the driver may drive the M first signal lines in parallel and drive the K second signal lines in parallel.

With the aforementioned configuration, the touch panel controller including the driver is able to excellently detect a signal based on driving of the pen point of the stylus pen touching the touch panel of a parallel driving method.

A stylus pen according to an aspect 5 of the invention is a stylus pen for touching a touch panel which has M first signal lines (M is plural), K second signal lines (K is plural) which intersect with the M first signal lines, and (M×K) electrostatic capacitances formed at respective intersections of the first signal lines and the second signal lines, including: a driving circuit which generates a first driving voltage based on a first code sequence and a second driving voltage based on a second code sequence; and a multiplexing circuit which drives a pen point of the stylus pen with a multiplexed voltage obtained by multiplexing the first driving voltage and the second driving voltage, in which the multiplexing circuit has a variable resistor one end of which is connected to a first terminal to which the first driving voltage is applied and whose resistance value changes based on information regarding the stylus pen, a fixed resistor one end of which is connected to a second terminal to which the second driving voltage is applied, and an output terminal which is connected to the other end of the fixed resistor and the other end of the variable resistor and which outputs the multiplexed voltage.

Moreover, an electronic device according to an aspect 6 of the invention includes the touch panel system according to the aspect 1.

With the aforementioned configuration, an effect similar to that of the touch panel system according to the aspect 1 is able to be realized.

The invention is not limited to each of the embodiments described above, and may be modified in various manners within the scope shown in the claims and an embodiment achieved by appropriately combining technical means disclosed in each of different embodiments is also encompassed in the technical scope of the invention. Further, by combining the technical means disclosed in each of the embodiments, a new technical feature may be formed.

INDUSTRIAL APPLICABILITY

The invention is able to be utilized for a stylus pen for touching a touch panel which has a plurality of electrostatic capacitances formed at respective intersections of a plurality of first signal lines and a plurality of second signal lines and a touch panel system using the same, and particularly able to be utilized for a stylus pen for touching a touch panel that drives a plurality of first signal lines and a plurality of second signal lines alternately and a touch panel system using the same.

REFERENCE SIGNS LIST 1 touch panel system
2 touch panel controller
3 touch panel
4 multiplexer
5 driver
6 sense amplifier
7 timing generator
8 AD converter
9 capacitance distribution calculation unit (position detection means)
10 touch recognition unit (position detection means)
15 stylus pen
16 pen position detection unit
21 sense circuit (synchronization circuit)
22 synchronization signal detection circuit (synchronization circuit)
23 timing generator (synchronization circuit)
26 drive circuit (driving circuit)
27 pen main body
28 grip unit
29 pen point unit
30 pen point cover
31 pen point axis
32 insulating body
38 pen point
40 sensor circuit (multiplexing circuit)
41 pressure sensor
60 mobile phone (electronic device)

The invention claimed is:

1. A touch panel system, comprising:

a stylus pen for touching a touch panel which has M first signal lines (M is plural), K second signal lines (K is plural) which intersect with the M first signal lines, and (M×K) electrostatic capacitances formed at respective intersections of the first signal lines and the second signal lines; and a touch panel controller that detects a position of the stylus pen, wherein the touch panel controller includes a driver that applies a voltage on the M first signal lines based on first signal line code sequences indicative of M code sequences among (M+2) code sequences having a length of N (N is plural) and supplies the two remaining code sequences to the stylus pen, and the stylus pen includes a driving circuit which generates a first driving voltage based on a first code sequence indicating one of two remaining code sequences among the (M+2) code sequences having a length of N (N is plural) and a second driving voltage based on a second code sequence indicating another one of the two remaining code sequences, and a multiplexing circuit which drives a pen point of the stylus pen with a multiplexed voltage obtained by multiplexing the first driving voltage and the second driving voltage, and the multiplexing circuit has a variable resistor one end of which is connected to a first terminal to which the first driving voltage is applied and whose resistance value changes based on information regarding the stylus pen, a fixed resistor one end of which is connected to a second terminal to which the second driving voltage is applied, and an output terminal which is connected to the other end of the fixed resistor and the other end of the variable resistor and which outputs the multiplexed voltage.

2. The touch panel system according to claim 1, wherein the information regarding the stylus pen is information indicating a writing pressure applied to the pen point.

3. The touch panel system according to claim 2, wherein the touch panel controller includes:

a driver that drives the M first signal lines with a synchronization signal in a sense mode period and thereafter drives the M first signal lines based on a code sequence in a driving mode period to output a first linear sum signal based on charges, which are accumulated in the electrostatic capacitances, along the K second signal lines, and drives the K second signal lines with the synchronization signal in a next sense mode period and thereafter drives the K second signal lines based on the code sequence in a next driving mode period to output a second linear sum signal based on the charges, which are accumulated in the electrostatic capacitances, along the M first signal lines; and position detection means that detects a position of a target, which has touched the touch panel, based on the first linear sum signal and the second linear sum signal, wherein the stylus pen includes a synchronization circuit that receives the synchronization signal, and the driving circuit generates the first driving voltage and the second driving voltage based on an output of the synchronization circuit.

4. The touch panel system according to claim 3, wherein the driver drives the M first signal lines in parallel and drives the K second signal lines in parallel.

5. The touch panel system according to claim 1, wherein the touch panel controller includes:

a driver that drives the M first signal lines with a synchronization signal in a sense mode period and thereafter drives the M first signal lines based on a code sequence in a driving mode period to output a first linear sum signal based on charges, which are accumulated in the electrostatic capacitances, along the K second signal lines, and drives the K second signal lines with the synchronization signal in a next sense mode period and thereafter drives the K second signal lines based on the code sequence in a next driving mode period to output a second linear sum signal based on the charges, which are accumulated in the electrostatic capacitances, along the M first signal lines; and position detection means that detects a position of a target, which has touched the touch panel, based on the first linear sum signal and the second linear sum signal, wherein the stylus pen includes a synchronization circuit that receives the synchronization signal, and the driving circuit generates the first driving voltage and the second driving voltage based on an output of the synchronization circuit.

6. The touch panel system according to claim 5, wherein the driver drives the M first signal lines in parallel and drives the K second signal lines in parallel.

7. A stylus pen for touching a touch panel which has M first signal lines (M is plural), K second signal lines (K is plural) which intersect with the M first signal lines, and (M×K) electrostatic capacitances formed at respective intersections of the first signal lines and the second signal lines, the touch panel having a touch panel controller that includes a driver that applies a voltage on the M first signal lines based on first signal line code sequences indicative of M code sequences among (M+2) code sequences having a length of N (N is plural) and supplies the two remaining code sequences to the stylus pen, the stylus pen comprising:

a driving circuit which generates a first driving voltage based on a first code sequence indicating one of two code sequences among (M+2) code sequences having a length of N (N is plural) received from the driver of the touch panel and a second driving voltage based on a second code sequence indicating another one of the two code sequences; and a multiplexing circuit which drives a pen point of the stylus pen with a multiplexed voltage obtained by multiplexing the first driving voltage and the second driving voltage, wherein the multiplexing circuit has a variable resistor one end of which is connected to a first terminal to which the first driving voltage is applied and whose resistance value changes based on information regarding the stylus pen, a fixed resistor one end of which is connected to a second terminal to which the second driving voltage is applied, an output terminal which is connected to the other end of the fixed resistor and the other end of the variable resistor and which outputs the multiplexed voltage, and a voltage being applied on the M first signal lines based on first signal line code sequences indicative of remaining M code sequences among the (M+2) code sequences, and the first code sequence indicative of one of the two code sequences among the (M+2) code sequences and the second code sequence indicative of another one of the two code sequences being supplied to the driving unit.

8. An electronic device comprising the touch panel system according to claim 1.

* * * * *